Jan. 13, 1970     A. R. PARILLA     3,489,373

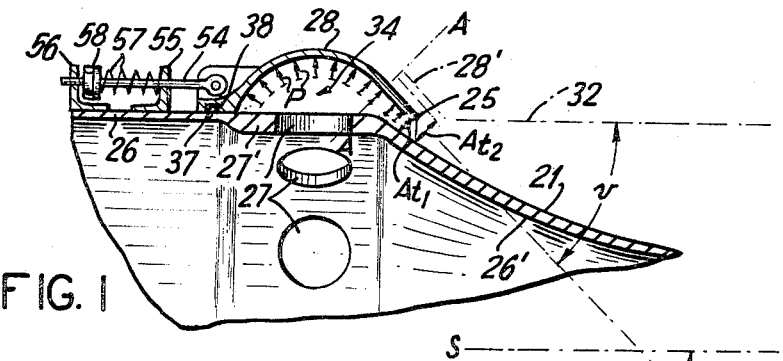
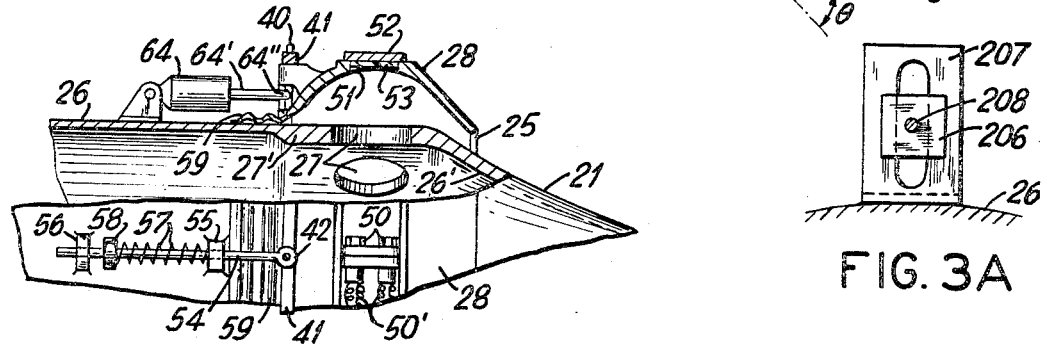
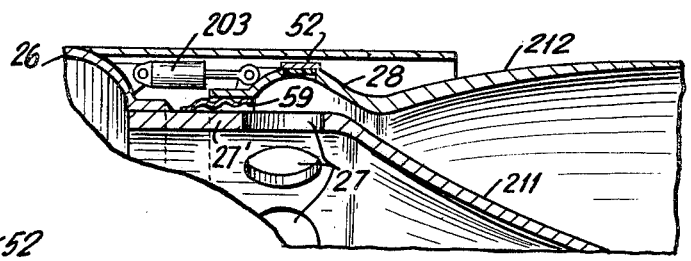
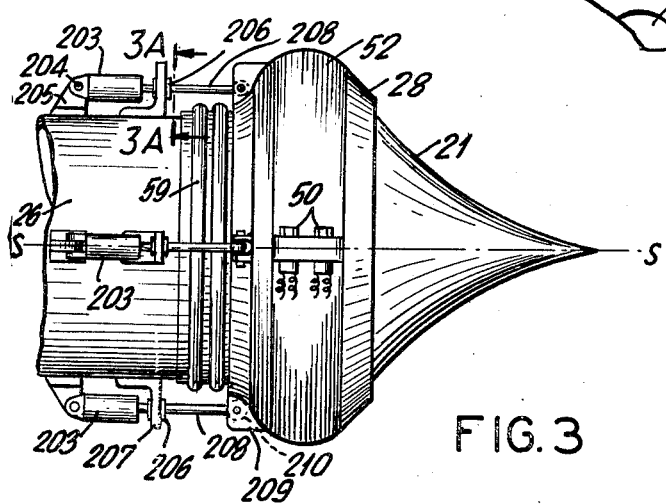

MISSILE CONFIGURATIONS, CONTROLS AND UTILIZATION TECHNIQUES

Filed Jan. 3, 1967     10 Sheets-Sheet 3

INVENTOR.
ARTHUR R. PARILLA

BY
Morgan, Finnegan, Durham & Pine
ATTORNEYS

Jan. 13, 1970   A. R. PARILLA   3,489,373
MISSILE CONFIGURATIONS, CONTROLS AND UTILIZATION TECHNIQUES
Filed Jan. 3, 1967   10 Sheets-Sheet 6

INVENTOR.
ARTHUR R. PARILLA
BY
Morgan, Finnegan, Durham & Pine
ATTORNEYS

Jan. 13, 1970   A. R. PARILLA   3,489,373
MISSILE CONFIGURATIONS, CONTROLS AND UTILIZATION TECHNIQUES
Filed Jan. 3, 1967   10 Sheets-Sheet 7

INVENTOR.
ARTHUR R. PARILLA
BY
Morgan, Finnegan, Durham & Pine
ATTORNEYS.

INVENTOR.
ARTHUR R. PARILLA

United States Patent Office 3,489,373
Patented Jan. 13, 1970

3,489,373
MISSILE CONFIGURATIONS, CONTROLS AND UTILIZATION TECHNIQUES
Arthur R. Parilla, 34 Crestview Road, Mountain Lakes, N.J. 07046
Continuation-in-part of application Ser. No. 302,222, June 14, 1963. This application Jan. 3, 1967, Ser. No. 607,068
Int. Cl. B64c *15/02*
U.S. Cl. 244—3.15                17 Claims

ABSTRACT OF THE DISCLOSURE

Missile configurations with engine and propellant control systems are the subject of this application together with weapons and navigational techniques employing same. Reaction engine control systems employing relatively moveable plug-cowl configurations with associated control systems are described herein for providing control of thrust direction and magnitude, engine operating conditions, missile kinematics, and other parameters of liquid and solid propellant rockets.

RELATED PATENTS AND APPLICATIONS

This application is a continuation-in-part of applicant's prior copending application Ser. No. 302,222, filed June 14, 1963, and now abandoned, for "Aircraft Missiles, Missile Weapons System and Space Craft."

The latter is in turn a copending division of application Ser. No. 701,571, filed Dec. 9, 1957 and now U.S. Patent No. 3,094,072, granted June 18, 1963. An additional application of the applicant, Ser. No. 860,304, is also related to the instant application, being another continuation-in-part of Ser. No. 701,571, and now Patent No. 3,151,446.

This invention relates to control systems and operating techniques for missiles having engines capable of controllable thrust magnitude and direction. Examples of such engines are found in applicant's above cited patents.

Described herein are apparatus and techniques for controlling various flight and engine parameters of such missiles to provide improved accuracy, flexibility and reliability of operation. Instrumentalities and techniques are disclosed for controlling thrust magnitude and direction, missile velocity, acceleration and attitude, engine efficiency and thrust termination over a wide range of environmental kinematic and aerodynamic conditions.

According to the invention new concepts in antispace missile weapons systems are provided. Defensive missiles are described for intercepting intercontinental ballistic missiles, satellites, or other space objects at extreme altitudes to provide defense over large areas. In order to insure accuracy of interception, the defensive missile according to the invention is capable of hovering flight at zero velocity in space for finite time periods while the guidance system seeks and locks onto the target, followed by a collision course in any direction to the target upon command of the guidance system. The defensive missile is capable of maneuverability in space in any direction in any of the three principal planes, covering a range of several hundred miles from its position during hovering flight. This flexibility may be provided with either solid or liquid propellant rocket engines.

To achieve the foregoing, novel control system arrangements are provided in which various flight parameters such as acceleration, velocity, incremental velocities, or their combination, may be maintained constant independent of variable drag due to variable altitude, or other environmental conditions, and independent of variations in missile mass, engine performance due to manufacturing tolerances, and other variables.

These new operational and control techniques permit improved anti-ballistic missile weapons systems for local defense against ballistic missile attack; improved ground-to-air defense; and improved long range air-to-surface missiles of minimum weight and maximum reliability.

BACKGROUND

Most jet engines in which thrust is developed by the discharge of a compressible fluid at supersonic velocities, such as rocket engines, ram-jet engines or turbo-jet engines, or combinations of these such as the ram-jet ducted-rocket, or the turbo-rocket, usually employ nozzles of the converging-diverging type, sometimes called a DeLaval or venturi nozzle, characterized by a fixed geometry having a constant throat area and constant ratio of area expansion in the diverging portion.

It is well recognized that a variable throat area nozzle improves the flexibility of engine operation over a broader range; thrust may be varied in magnitude as the throat area is increased or decreased; the combustion characteristics and internal gas dynamics upstream of the throat being greatly affected by the magnitude of the throat area.

Engine efficiency is also improved by a variable nozzle expansion ratio, resulting in increased thrust or engine efficiency. The desired area expansion ratio is a function of pressure ratio or ratio of internal chamber pressure at nozzle inlet to ambient atmospheric pressure at nozzle discharge. Even in engines which operate at substantially constant chamber pressure, as in liquid rocket engines, the pressure ratio increases with altitude. If the nozzle is designed for sea-level conditions, under-expansion and loss of efficiency occurs at higher altitudes. If it is designed for a high altitude condition, over-expansion occurs at sea-level resulting in a loss of thrust during the critical take-off condition.

Most engines employing fixed geometry nozzles, are designed to operate at fixed thrust levels. While some degree of throttleability is possible in liquid propellant rocket engines and in air breathing engines by means of control valves which reduce mass flow rate of propellant or fuel to the engine, this range is limited. Combustion chamber pressure reduces at the lower mass flow rates with a constant nozzle throat area, further throttling being limited by combination instability or flame-out at the lower chamber pressures. The range of throttleability may therefore be increased by a variable throat area which maintains chamber pressure within operable limits even at reduced thrust.

This lack of flexibility, or throttleability is even greater in solid propellant rocket engines for once ignition occurs, further control over thrust is impossible in conventional engines. The thrust time characteristic is dependent upon the internal ballistics, i.e., the propellant burning rate, propellant burning surface, propellant density and nozzle throat area, the ratio of propellant burning surface to nozzle throat area, being an important parameter, denoted by the symbol K. Since these quantities are all fixed in the design stage, further control during flight is not possible. A variable nozzle throat area controllable during flight can, then, by varying K exert an important control over thrust.

In a similar manner, control over thrust termination is a serious problem with solid propellant engines. While this is accomplished readily in liquid propellant rocket engines and in air breathing engines, simply by valve closure, conventional solid propellant rocket engines require special provisions to provide controlled and reproducible thrust termination, which is critical for accurate control of ballistic missiles. One such method is by ejection of a nozzle insert, the abrupt increase in nozzle throat area causing a rapid pressure drop which extinguishes combustion. It is found that undesirable thrust peaks occur with this method as a result of the simultaneous product of high chamber pressure and large throat area at the moment ejection occurs. This is objectionable since the high accelerations thus transmitted to the missile may damage sensitive components.

Alternate means for thrust termination provide auxiliary nozzles or orifices which discharge combustion gases in a forward direction when burst discs are energized, thus neutralizing the thrust from the primary nozzles discharging rearwardly. This creates a packaging problem for disposition of the gases from the missile, and for loading propellant, while the additional components add weight and complexity to the system. Also, neither solution permits re-starts for those applications where intermittent thrust may be desired in a controllable solid propellant rocket engine.

In applying propulsion systems to guided missiles, it is frequently desired to vary not only the magnitude of thrust, but also its direction. Means for thrust vector directional control can provide missile stability and maneuverability during launch and during flight. Substantial reduction in cost, weight and aerodynamic drag can be achieved by eliminating large aerodynamic fins, and complex fittings required for fin attachment. This, then, reduces storage space and improves accuracy by reducing dispersion due to aerodynamic gusts.

Present methods for thrust vector control generally require subsidiary means attached to or near the nozzle exit so as to deflect the jet stream when actuated. Examples are jet vanes, as used on the German V-2 rocket, and more recently, jetavators.

Jet vanes are submerged in the jet stream issuing from the nozzle, rotation of the vane causing deflection of the jet stream thereby varying the direction of thrust. Since such vanes are constantly immersed in the jet stream, they cause drag losses reducing net thrust even when control forces are not required. This objection is eliminated in jetavators in which a circular ring mounted on gimbal supports surrounds the jet stream at the nozzle exit. The ring is normally free of the jet stream, but dips into it when actuated to deflect the jet and hence the resultant direction of thrust. Obviously, the jetavator must be of larger diameter than the nozzle exit, thereby limiting expansion ratio, or requiring diameters larger than maximum diameter of rocket case, in which event, aerodynamic drag replaces drag due to immersion in jet stream. Large deflection angles are required to be effective, since only a portion of the ring intersects the jet stream, the opposite diameter moving away from it. In both jet vanes and jetavators, additional components are required which must be constructed of high temperature resistant materials, and which add weight, complexity and cost, and reduce reliability.

An alternate method of thrust vector control is used with liquid propellant rocket engines in which the entire thrust chamber assembly is pivotally mounted on gimbal rings to provide freedom of motion in two perpendicular planes. Obviously, the gimbal ring and mounting provisions must be designed to transmit the full thrust loads, adding weight. Also, control forces must be large to provide the desired high frequency of response. A further problem exists because of the need for flexible feed lines for delivering propellant to the thrust chamber. As engine size increases, these become large diameter pipes with the requirement for flexibility becoming increasingly difficult. This method is wholly impractical for solid propellant rocket engines wherein the entire mass of propellant is stored within the thrust chamber, resulting in a very high moment of inertia.

Other problems associated with solid propellant rocket engines which may be alleviated by the variable nozzle throat area technique described in the aforementioned patents and in further detail hereinafter, include: (1) the temperature sensitivity of the propellant to ambient temperature of the grain before firing; (2) erosive burning, whereby burning rate increases upon ignition because of high velocity gases passing over propellant burning surfaces; (3) variation of propellant burning surface during burning, including effects of small cracks in propellant; and (4) sliver formation, or small sections of unburnt propellant remaining after burnout.

Items (1), (2) and (3) result in peak chamber pressures, increasing design requirements, thereby adding weight, while (4) adds weight while contributing nothing to performance.

In addition to the foregoing, a major problem which is aggravated by the limitations of present propulsion systems, is the successful interception of ballistic missiles, satellites or other objects travelling at great velocities through or from outer space. The split second precision required to insure collision and mutual destruction between two bodies travelling at great velocities is enormous.

These, and other problems hereinafter described, offer serious limitations to performance of aircraft, missiles, missile weapons systems, and space ships.

It is, therefore, the purpose of this invention to advance the state of the art in missile configuration, control and utilization to overcome the aforementioned limitations and to accomplish, in addition to those objectives recited in applicant's Patent No. 3,094,072, the following specific objectives:

To provide mechanical or fluid spring control arrangements for automatically controlling the variable throat area of jet engine nozzles.

To provide fluid, and/or electrically operated control systems and actuators for controlling the variable throat area of jet engine nozzles.

To provide improved ballistic missiles whose flight trajectory is related to engine performance so as to provide optimum nozzle thrust coefficient as function of altitude by automatically varying the nozzle area expansion ratio.

To provide a missile system capable of maintaining a constant acceleration during flight independent of variable drag at variable altitude, variable mass, or other environmental condition.

To provide a missile system capable of increasing its own velocity by a fixed increment independent of variable drag at variable altitude, variable mass or other environmental condition.

To provide a missile system capable of maintaining a constant flight velocity independent of variable drag at variable altitude, variable mass, or other environmental condition.

To provide a missile system capable of maintaining constant acceleration followed by constant velocity, or vice versa, and repetitively in any prescribed manner as desired, independent of variable drag, variable mass, or other environmental condition.

To provide a novel anti-space missile weapons system for defense of large areas against objects travelling through space, such as inter-continental ballistic missiles, artificial satellites, extra-terrestrial bodies, or other objects.

To provide an anti-ballistic missile weapons system for interception of enemy ballistic missiles near defensive target areas.

To provide an anti-missile missile system capable of hovering flight at constant altitude and zero velocity while the engine thrust automatically maintains a constant thrust-weight ratio of unity as propellant is consumed.

To provide an anti-missile missile system capable of hovering flight while the guidance system seeks and locks onto the invading enemy target, followed by high maneuverability of the defensive missile in any direction as it accelerates on a collision course for target interception.

To provide a simple mechanical analog computer as part of the guidance and control system of an anti-missile missile for directing the defensive missile from its hovering position to the desired collision course for target interception.

To improve the throttleability of liquid propellant rocket engines by maintaining thrust chamber pressure at reduced propellant flow rates automatically by means of a novel variable area nozzle control system.

To provide new liquid propellant booster rockets incorporating new concepts in thrust chamber control, expellant bag design for gas pressurization of propellant tanks, and improved reproducibility in pressurization by gas generators.

To provide greater safety by rendering missiles nonpropulsive during storage in the event of accidental ignition.

To protect rocket casings against destructive failure in the event of moderate grain cracking by use of a variable area nozzle acting as a pressure relief valve.

Serving to illustrate exemplary embodiments of the invention are the drawings of which:

FIGURES 1 and 2 are fragmentary views in longitudinal section of a nozzle embodying portions of control arrangements according to the invention;

FIGURE 3 is a fragmentary view of a nozzle embodying modifications to the control arrangements illustrated in FIGURES 1 and 2;

FIGURE 3A is a detail view showing connecting elements employed in the arrangement of FIGURE 3;

FIGURE 4 is a fragmentary view in longitudinal cross-section illustrating the application of the control system of the invention to a nozzle employing internal expansion;

(A) GENERAL FEATURES OF VARIABLE COWL-PLUG CONFIGURATION

Figure 5:
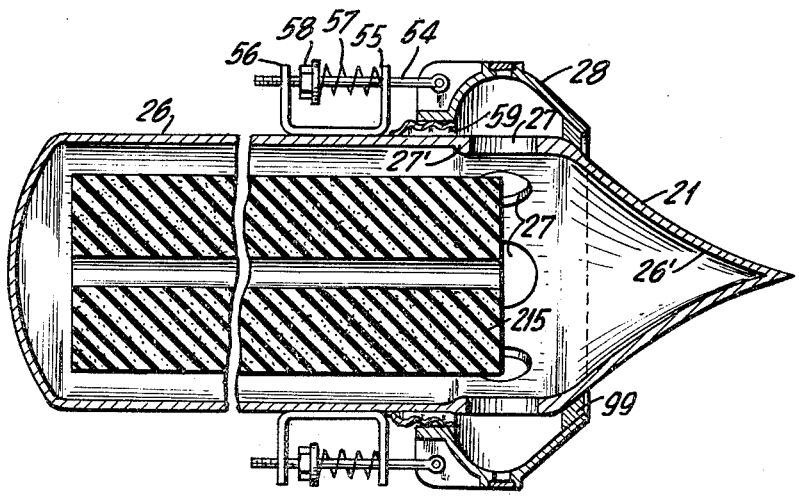
FIGURE 5 is a view in longitudinal cross-section of a controllable solid propellant missile.

(1) Control of pressure, thrust magnitude, and related factors

In applicant's previously cited prior copending application and patents, techniques are illustrated for varying the throat area and other geometric parameters of nozzles employed in thrust-producing devices. Among the illustrative examples are a number of embodiments for varying the throat area and stream orientation in rocket engine nozzles to achieve variations in expansion ratio, chamber pressure, pressure ratio, propellant specific impulse, thrust magnitude, thrust direction, and related parameters. A brief review of the foregoing will serve as an aid to understanding the invention.

FIGURE 1 illustrates the implementation of these techniques in a plug-type rocket engine nozzle. Reference may be made to Patent No. 3,094,072 for further description of its structure and operation.

In the nozzle of FIGURE 1, the resultant pressure forces acting on the cowl 28 are transmitted by the rod 54, adjustable nut 58, and compression spring 57, supported by the brackets 55 and 56 mounted on the case 26.

The control forces to position the cowl may be supplied in any desired manner. The simple mechanical springs in FIGURE 1 may be replaced by electrical, hydraulic or pneumatic actuators, with signals from the guidance or control system to vary the nozzle position in any prescribed manner, as described hereinafter.

(2) Thrust termination

When adjusted by any of these means, the throat area may be increased continuously, with a continuous decrease in chamber pressure, thereby achieving thrust termination while avoiding the abrupt discontinuity which occurs with other techniques such as nozzle insert ejection. In this manner, thrust decay can be reproducibly controlled simply by extending the cowl 28 so as to increase the throat area to many times its normal design value. With propellant properties which permit continued burning at low ambient atmospheric pressures, the cowl may again be retracted until, at super-critical pressure ratios, the thermal energy of the gases is again converted into kinetic energy of the jet stream, with high velocities directed aft, again rendering the unit propulsive.

The above system also has the advantage that vernier control over both missile velocity and attitude may be provided by operating at reduced thrust levels with vector control, as described more fully hereinafter, available before thrust termination. Other means for thrust termination are described in the above-noted 3,094,072 patent and illustrated hereinafter in FIGURE 2 where ring 52 may be released by destruction of the explosive bolts 50.

(3) Thrust vector direction control

In addition to thrust magnitude control and termination, FIGURE 2 also illustrates means for controlling the direction of the thrust vector. As illustrated, the means involve mechanisms, e.g. linear actuators 64, for causing angular motion of the cowl about a transverse axis relative to the cylinder 26 to deflect the stream. Further description is found in applicant's 3,094,072 patent.

An alternate method for providing both translatory and oscillatory motion of the cowl may be provided without gimbal rings by use of four actuators 203 mounted 90° apart, as shown in FIGURE 3 and described in greater detail in the 3,094,072 patent.

(4) Combined variable area, thrust vector control and thrust termination with internal supersonic expansion The improvements shown herein are not necessarily limited to nozzles with external expansion. The control mechanisms may be employed where variable area, thrust vector control and thrust termination are combined within a nozzle employing only internal expansion. This is shown in FIGURE 4 and described in greater detail in said 3,094,072 patent.

(B) PARAMETER REGULATING TECHNIQUES

A variable throat area nozzle offers important mechanical solution to many problems in solid propellant rocket engines. It makes possible substantial reduction in case weight beyond the use of higher strength materials by automatically maintaining constant chamber pressure independent of the temperature sensitivity of the propellant, and of the progressivity or regressivity of the propellant grain.

It also makes possible a controllable solid propellant whose thrust may be varied at will, providing flexibility in operation which even surpasses throttleability of liquid propellant rocket engines.

FIGURE 5 illustrates the application of the variable nozzle principles to a solid propellant rocket engine, which is described in greater detail in the 3,094,072 patent.

It may be seen that when the internal pressure increases (due to any of several reasons as described below), the higher pressure force causes further compression of the spring 57, opening the cowl to a larger throat area. Similarly, when the internal pressure decreases, the lower pressure force causes the spring 57 to extend, thereby retracting the cowl, resulting in a smaller throat area. The throat area thus increases automatically with increasing chamber pressure.

Figure 6:
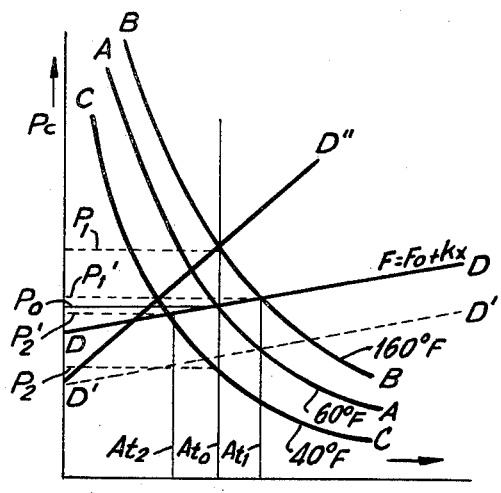
FIGURE 6 is a graph which plots the relationship between various system variables.

Other parameter regulating techniques are described in the aforesaid patent and include (1) constant pressure operation independent of ambient temperature (see FIGURE 6), (2) constant pressure operation independent of grain regressivity and progressivity, (3) reduced thrust variation, and (4) adjustable thrust level.

(C) PARAMETER REGULATING TECHNIQUES WITH EXTERNAL PROGRAMMABLE CONTROL

The use of a variable area nozzle makes possible a controllable solid propellant rocket engine in which the thrust may be varied in magnitude at will throughout flight. Thrust variation may be obtained by varying the nozzle cowl position and, hence, throat area responsive to any type control system.

(1) General control techniques

Figure 7:
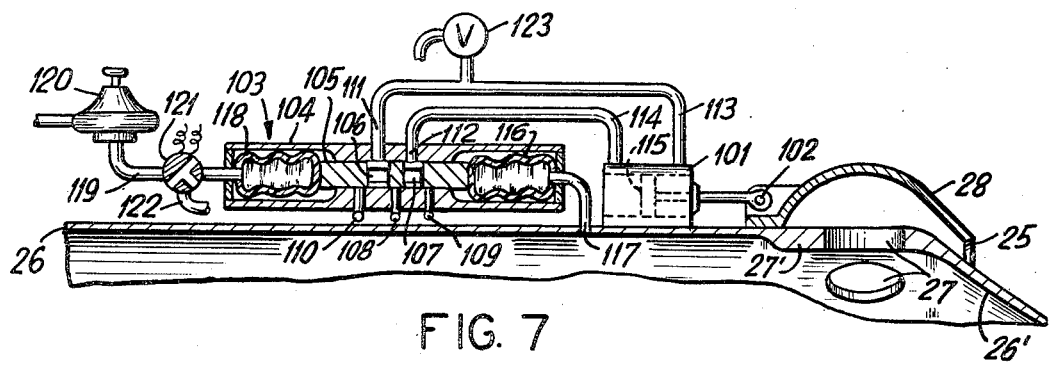
FIGURE 7 is a fragmentary diagrammatic view in longitudinal cross-section of a hydraulic missile control system.
Figure 8:
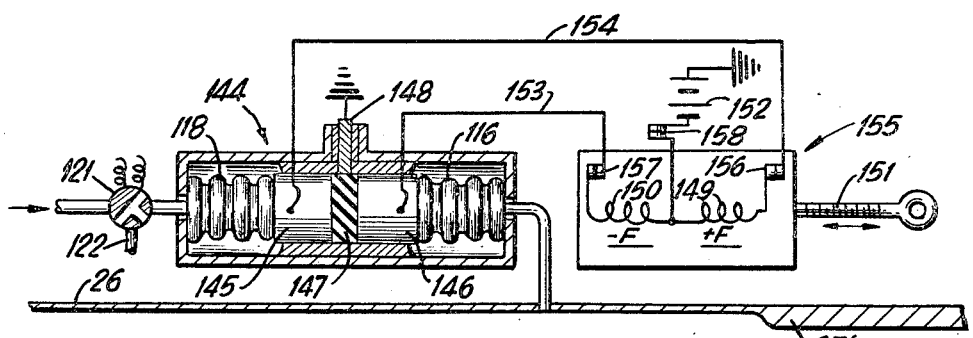
FIGURE 8 is a view corresponding to FIGURE 7, but employing an electrical control system.

The mechanical springs for positioning the cowl as shown in FIGURE 5 may be replaced by servo-controls, either fluid or electrically actuated, illustrated in FIGURES 7 and 8 respectively.

In the systems shown in FIGURES 7 and 8, the difference between rocket chamber pressure and a control pressure from any source is used as the input signal to increase or decrease thrust.

A system using fluid actuation is illustrated in FIGURE 7, while FIGURE 8 illustrates a system with electrical actuators. Further description of these systems and their uses in controlling thrust and thrust termination are found in the 3,094,072 patent.

Figure 9A:
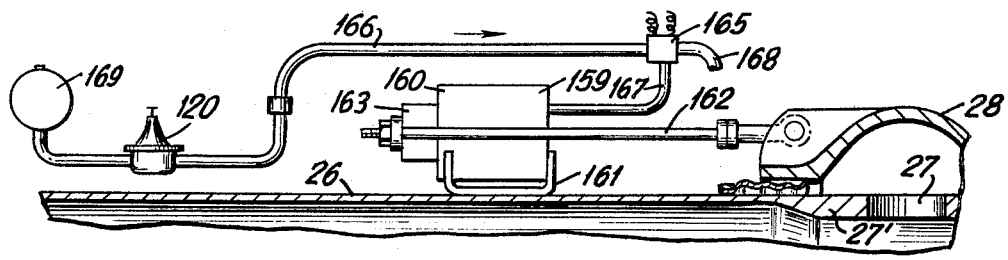
FIGURE 9A is a fragmentary diagrammatic view in longitudinal cross-section of a control system employing fluid spring means.
Figure 9B:
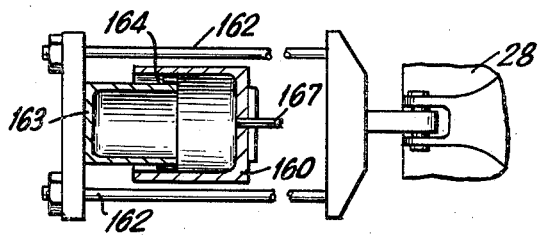
FIGURE 9B is a cross-sectional detail view of the variable fluid springs in the system of FIGURE 9A.

A fluid spring installation is illustrated in FIGURES 9A and 9B in which the fluid spring assembly 159 replaces the mechanical spring 57 and associated parts earlier described. As described in the 3,094,072 patent, this arrangement may be utilized for nonpropulsive storage, thrust termination, and booster disposal.

(2) Control techniques for regulating acceleration and velocity

As noted above, the adjustable cowl-plug configuration lends itself with considerable facility to control over various missile parameters by way of self regulation and in response to external controls.

Control of thrust magnitude, thrust direction, chamber pressure, thrust termination and related conditions such as those associated with non-propulsive storage and booster disposal, has been described hereinbefore.

These techniques are also applicable to the control of other parameters dealing with missile kinematics.

The accuracy and, hence, reliability with which missiles reach their targets may be greatly improved if the normal variations from round to round could be eliminated. These variations include missile weight, propellant loading, and engine performance due to manufacturing tolerances; and environmental conditions, such as ambient temperatures, and altitudes, and other factors which vary the missile weight, drag and thrust relationships during flight.

As one example, in the case of air-to-air or air-to-surface missiles, the drag may vary considerably dependent upon the altitude of the carrier plane from which the missile is launched. Thus, the time to reach the target could vary due to cumulative variations. There are, of course, other examples such as Anti-ICBM missiles where great accuracy is required to insure successful interception of the attacking ICBM.

If the thrust of the variable nozzle rocket engine is controlled responsive directly to some flight parameter, such as acceleration, velocity, or both, its accuracy could be greatly improved, cancelling normal variations such as those set forth above.

In applicant's above cited copending application Serial No. 302,222 and Patent No. 3,094,072, systems are described for controlling the missile parameters acceleration and velocity.

Figure 10A:
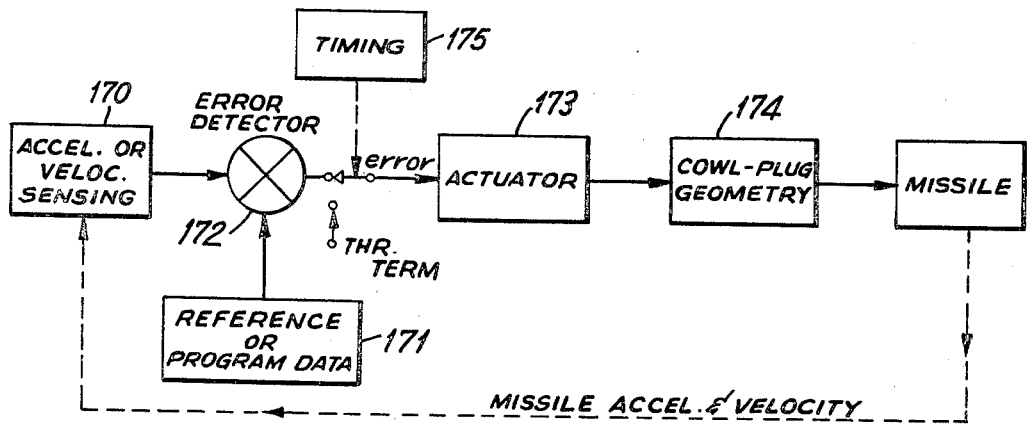
FIGURE 10A is a block diagram illustrating a control system for controlling missile kinematics.

A schematic indication of these systems for the case of acceleration control is illustrated in FIGURE 10A. An accelerometer 170 is oriented to sense missile acceleration. Any appropriate acceleration measuring instrument may be employed, two types mentioned in the copending application Ser. No. 302,222 and Patent No. 3,094,072 being mass-spring units with either mechanical or fluid springs.

Desired acceleration, either a constant reference value, or programmable values for adjustable control during flight, is set into the system by means 171 which may be for example arrangements which deflect the mechanical spring or pressurize the fluid spring.

The accelerometer output, indicative of actual missile acceleration is coupled to an error detector 172 along with the desired acceleration data.

The error detector may be of any known configuration and, as described in the copending application Ser. No. 302,222 and Patent No. 3,094,072, can take the form of a differentially actuated electrical switch arm or a differentially actuated fluid valve spool.

Any discrepancy between actual and desired acceleration is reflected in an error indication manifested as an electrical or hydraulic signal. This signal is fed to the actuator 173 which causes a corrective change in the cowl-plug configuration.

When the correction is completed, actual and desired missile acceleration are brought into conformity.

The period of controlled acceleration may be adjusted by suitable timing means such as 175 which are adapted to disable the servo controlled acceleration mode.

For example, missile acceleration can be maintained for a controlled time interval and then terminated by timing means 175 thus providing a controlled velocity increment in missile performance. By regulating acceleration as hereinbefore described during the timed interval, a desired terminal velocity is thereby achieved. The timing device can at this time then program a thrust termination into the power actuator.

Velocity control may be accomplished by substituting velocity sensing means in the system of FIGURE 10A thus providing an alternate method for establishing desired missile velocity. Any velocity responsive means may be used, such as those which sense the ratio of dynamic to static pressure when the missile operates within the atmosphere or any other means.

Figure 10B:
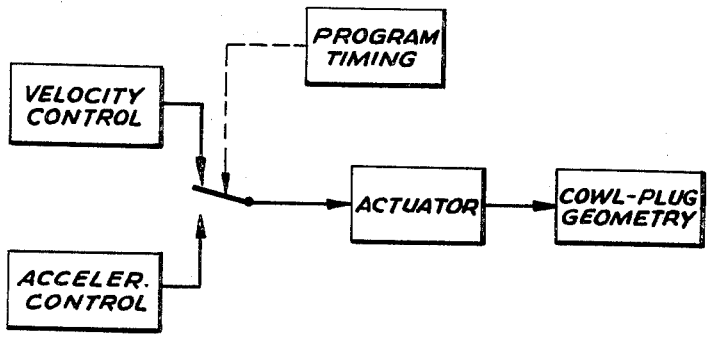
FIGURE 10B is a block diagram illustrating missile velocity and acceleration control modes.

Joint control is also obtainable in the manner shown in FIGURE 10B by timed switching of the cowl-plug actuator between a velocity control mode and an acceleration control mode. The timing may be programmed with local devices such as motor-operated switches or from the guidance system.

(3) Angle of attack vector control system

In general, the attitude sensing equipment in the missile, with or without external commands, supplies the required data to the thrust vector control system hereinbefore described. In certain cases, such as one hereinafter described, it is desired that the missile follow a course angle $\theta$ while maintaining a missile heading $\beta$ which is different from the course angle. Under these conditions, the missile will fly at an angle of attack ($\alpha = \theta - \beta$), it being noted that outside the atmosphere lift and drag are negligible and therefore not relevant in missile movement.

Figure 10C:
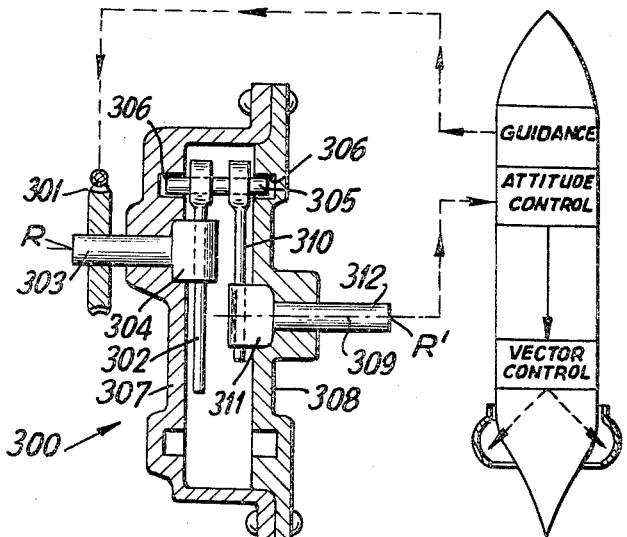
FIGURE 10C is a partially diagrammatic, partially cross-sectional view of an analog computer employed in the direction control system of a missile.
Figure 10D:
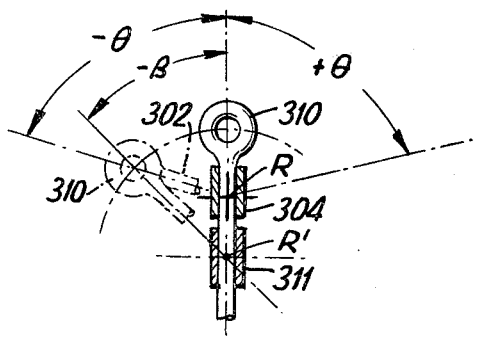
FIGURE 10D is a fragmentary, partially cross-sectional view of a portion of the computer of FIGURE 10C.

A simple mechanical analog computer, shown in FIGURES 10C and 10D, may be used to quickly determine the proper missile heading, $\beta$, for any desired flight direction, $\theta$.

The computer assembly 300, of FIGURES 10C and 10D is designed so that an input signal of angle $\theta$ produces an output signal equal to angle $\beta$.

As shown in FIGURE 10C, the worm and wheel, 301, rotates the driver arm 302 through the angle $\theta$ by means of the shaft 303 containing a socket 304 in which the driver arm 302 is free to reciprocate. The driver arm rotates the pin 305 within the grooves 306 in the housings 307 and 308, the grooves being concentric with the computer centerline 309. The driver arm 302 through pin 305 also rotates the driven arm 310 which is mounted in the socket 311 integral with the shaft 312, located on the centerline 309. Thus, as shown in FIGURE 10D, rotation of the input shaft 303 through angle $\theta$, causes rotation of the output shaft 312 through the angle $\beta$. The guidance system then determines only the desired flight direction, $\theta$, the analog computer then supplying the corresponding missile heading angle, $\beta$, to the vector control system.

The driver and driven arms 302 and 310 are both in the vertical plane during climb and while hovering. When the gudiance system signals a desired flight path of $+\theta°$ (+ plus being in the clockwise direction) the driver shaft 303 rotates the arm 305 through $-\theta$ (counterclockwise), the driven arm 310 and output shaft 312 rotating through $-\beta°$. Rotation of shaft 312 introduces a bias, or "error" in the control system which maintains the missile centerline coincident with the vertical reference axis through the Earth's center. The missile is thus rotated through the angle $\beta$, or until the driven arm 310 again coincides with the vertical reference axis, O-A. The missile will now have the desired heading, $\beta$, to accomplish the flight path $\theta$. The new missile heading will be maintained constant with reference to the vertical reference axis by the same nozzle vector control system as in vertical flight.

(4) Generalized control techniques

Figure 10E:
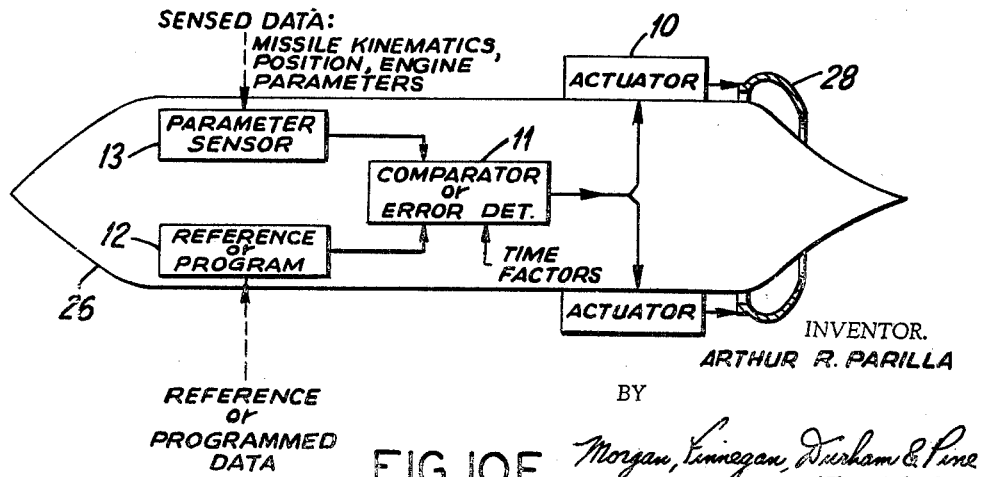
FIGURE 10E is a block diagram and schematic illustration of a general control arrangement for controlling missile performance.

FIGURE 10E grahically summarizes and generalizes the control techniques hereinbefore described for controlling missile behavior. In the illustration, the missile is identified at 26 and includes adjustable cowl 28. The cowl is uni-directionally moved for the control of thrust magnitude and differentially moved for thrust vector direction control. Movement is accomplished by the actuators 10 which may be any of the types hereinbefore mentioned. The actuators 10 are driven by the error or correction signal derived from the comparator 11 which receives in turn two inputs. One input comprises a signal representing the particular parameter which is being sensed, this being derived from the parameter sensor 13. The other input is a command signal or signal indicative of the reference condition, derived from control means 12. If these signals do not correspond, indicating the actual condition differs from the desired condition, an error or correction signal is developed. This error signal operates the actuators 10 to bring the actual condition into correspondence with the desired or commanded condition.

Maintenance of the missile in a desired angular orientation relative to a reference line such as the vertical, was described hereinbefore. In such an application, the control device 12 is supplied with the desired angular orientation data, e.g. the angle $\theta = \theta_1$. With appropriate translation, this signal is fed to the comparator 11 which compares this signal with the signal from sensor 13 which indicates the actual angular orientation of the missile. The sensor may be a vertical seeking gyroscope, or a stabilized platform or the like. If the command angle is different from the actual angle sensed by the sensor, an error or correction signal is generated in the comparator 11 and fed to the actuators 10. In this application, the actuators are differentially driven to produce cowl rotation thereby causing the thrust vector direction to change. In response, the missile commences to change heading and when the actual heading corresponds with the desired heading, the error signal disappears and the thrust vector control system is accordingly deenergized after the usual stabilizing transient. For angle-of-attack types of control, the input device 12 may include the $\theta$ to $\beta$ converter shown in FIGURE 10C.

As noted hereinbefore and described more fully hereinafter, the command signal or reference level may be programmed into the system initially or may be received from a remote point during flight. For example, desired thrust levels may be preprogrammed in the control system with timing means employed to command the desired levels in accordance with the program. In the missile weapon system described hereinafter, desired or commanded missile conditions are received in one mode from a remote point.

FIGURE 10E is also illustrative of the examples hereinbefore given of means for automatically controlling engine performance factors, e.g. chamber pressure. In these cases, the sensed parameter is chamber pressure. The command or reference level of chamber pressure is compared with the sensed, i.e. actual chamber pressure, the latter being transduced with the aid of the interior cowl surface. Any unbalance causes the actuation of the cowl 28, the unbalance constituting the error signal.

In like manner, the control systems of FIGURES 7 and 8 are illustrated generally by FIGURE 10E. The bellows 116, serving as the chamber pressure sensor, and bellows 118 serving to supply the system with the commanded or desired chamber pressure are represented by 13 and 12 in FIGURE 10E. The comparator of that figure comprises the control valve 103 or the switch 144, each of which develops an error signal which is fed to the respective actuator 101 and 155 in FIGURES 7 and 8, and 10 in FIGURE 10E.

In the case of missile kinematics, the control system reflects arrangements such as those shown in FIGURES 10A and 10B. The accelerometer mass or velocity sensing system, represented by parameter sensor 13, supplies one input to the comparator 11 of FIGURE 10E. The command or reference level is established as described hereinbefore, and is represented at 12. An error or correction signal from the compartor 11 drives the actuators.

From the foregoing, it may be seen that complete control over missile position, kinematics and engine parameters is attainable.

(D) APPLICATIONS TO OTHER NOZZLE CONFIGURATIONS

The control techniques hereinbefore described may also be utilized with other nozzle types such as that shown in applicant's above cited patents, 3,151,446 and 3,094,072.

(E) APPLICATIONS TO LIQUID PROPELLANT ROCKET ENGINES

Emphasis has been placed upon improvement in solid propellant rocket engines because the flexibility of operation described herein represents a major advance in the state of the art with respect to conventional solid propellant rocket engines.

Similar improvements may be made in liquid propellant rocket engines as well. The use of variable throat area and variable expansion ratio nozzles by application of the principles herein described also permits greater flexibility in operation compared to conventional liquid propellant rocket engines.

Important differences exist in the application of the variable throat area nozzle to the two types of rocket engines. In the solid propellant rocket engine, all controls are applied directly to the variable area nozzle, the mass flow rate being a dependent variable which automatically increases or decreases in response to changes in throat area through the influence of chamber pressure on burning rate for a given propellant grain.

In the liquid propellant rocket engine, the controls may be applied directly to the propellant feed system controlling the mass flow rate to the thrust chamber, the nozzle throat area becoming the dependent variable which automatically increases or decreases responsive to change in the propellant mass flow rate.

Figure 11:
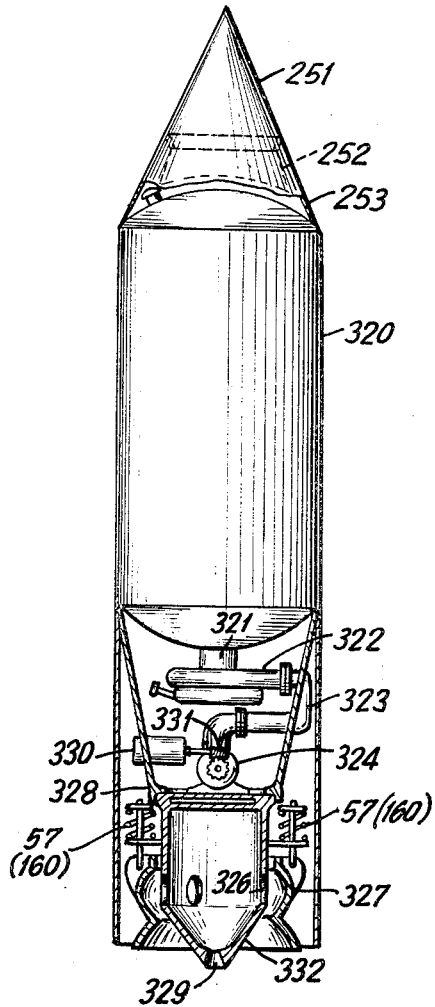
FIGURE 11 is an elevation view partly in section of a liquid propellant rocket and control system therefor.

This system is illustrated in FIGURE 11 which shows a typical missile powered by a liquid propellant rocket engine incorporating these new features. For simplicity a liquid monopropellant system is illustrated, with an uncooled thrust chamber. Extension of the design to provide for the usual bi-propellant system with a regeneratively cooled thrust chamber would follow normal conventional practice to a great degree.

In FIGURE 11, 251 is the warhead, and 252 is a guidance system supported by the airframe 253. Propellant tank 320 contains a liquid monopropellant which flows through the outlet 321 to the turbo-pump assembly 322, and is discharged at high pressure through the rigid tubing 323 to a regulating valve 324 mounted on the forward end of the thrust chamber assembly 325. The latter is of novel design having an integral plug 332 at its aft end and contains radial ports 326 enclosed by a flexibly mounted cowl 327 attached to the chamber by means of flexible connection such as the bellows of FIGURES 2–5 or a flexible seal, which is insulated as shown in these figures. The cowl may be positioned by mechanical springs 57 as hereinbefore described, or by fluid springs, such as 160 of FIGURES 9A and 9B.

The thrust chamber is rigidly mounted to the thrust structure 328, eliminating the heavy gimbal structure and flexible feed lines otherwise needed to oscillate the complete thrust chamber for vector control. The latter is achieved instead by rotation of cowl 327 as shown and described hereinbefore.

A small conventional nozzle 329 is formed at the apex of the plug surface as an additional safety device to prevent accumulation of unburnt propellant during the starting transient as ignition occurs, the chamber being self-draining.

Variable thrust is controlled by the actuator 330 which operates the worm-gear mechanism 331 to vary the mass flow rate through the regulating valve 324, a butterfly valve being the typical means for varying the flow rate.

The actuator 330 may be a rotary actuator driving the worm-gear, or may be replaced by a linear actuator through a suitable lever and linkage system as desired. The actuator may be fluid or electrically driven, being responsive to actions of the various control systems previously described such as those of FIGURES 7–10E.

The operation of the engine may be best described by a simple example comparing it with a conventional liquid engine with a constant throat area nozzle. In the latter case, throttleability is accomplished by control of the propellant feed system, such as by the regulating valve or equivalent means, the reduced mass flow rate reducing chamber pressure with a constant throat area and, hence, thrust. The maximum thrust is then limited by the maximum pumping capacity available, while the minimum thrust is limited by the effect of minimum pressure on combustion stability. For a typical case, the ratio of maximum to minimum pressure may be roughly three to one, the thrust ratio differing from this slightly due to change in nozzle performance at the two chamber pressures.

With the variable throat area nozzle in FIGURE 11, the chamber pressure may be varied by the propellant feed system in the same manner as in the constant throat area engine. In this case, however, the nozzle throat area also increases with increase in chamber pressure. For minimum thrust, the low chamber pressure acting on the differential cowl area causes only a small cowl extension, or minimum throat area, the product of the two providing minimum thrust. As chamber pressure is increased to its maximum value, the cowl pressure forces further compress the spring 57 (or its equivalent fluid spring 160), increasing throat area to maximum value, the product of the two now providing maximum thrust. The maximum to minimum thrust ratio is now the product of the maximum to minimum pressure ratio and the maximum to minimum throat area ratio neglecting differences in nozzle thrust coefficient as function of chamber pressure. If the same pressure ratio of 3 now results in, say, a fourfold increase in throat area, the thrust ratio for the variable area nozzle becomes approximately 12, instead of 3 with the constant area nozzle. The above numerical values are only illustrative, the actual maximum to minimum ratios for pressure and area being subject to specific detail designs.

It may be seen that, for a variable thrust engine, a relatively high spring rate would be desired for the spring 57 (or its equivalent fluid spring 160), for positioning the cowl in order to provide a substantial pressure change for the corresponding area change. This is in contrast to the system described for maintaining constant thrust for the solid propellant rocket engine under variable ambient temperatures as described previously.

For ballistic missile performance, a variable nozzle expansion ratio as a function of altitude may be provided as described hereinafter for solid propellant rocket engines. The regressive thrust-time characteristic of the solid propellant may be simulated in the liquid rocket installation of FIGURE 11 by adapting the actuator, 330, to cause gradual closing of the regulating valve 324 as a function of time. This may be done by a constant-speed motor drive for the worm-gear 331, or any of a number of types of control, such as a cam and lever system to provide any desired valve opening, or mass flow rate, for thrust programming as a function of time. In this manner, the cowl will automatically retract as a function of the reduced flow rate, or reduced chamber pressure, making possible automatic variation of expansion ratio with altitude as a function of the common parameter, time.

The variable area nozzle also offers improved control over the starting transient, since ignition can be accomplished at the minimum thrust level in very large engines, with similar improvement during the shutdown transient.

Other means for varying the mass flow rate or chamber pressure may be employed. The speed of the turbo-pump assembly may be controlled, such as by a regulating valve and actuator, similar to 324 and 330, in the feed lines to the gas generator driving the turbo-pump (not shown), or by multiple injector cavities employing individual on-off valves to each cavity, thereby controlling the number of injector orifices in use. Equivalent means such as a variable orifice injector in the thrust chamber (not shown) may also be used as well as various combinations of the foregoing.

Obviously, manual control may be provided, such as in piloted aircraft, with a single throttle control operating the propellant feed system only, while the nozzle throat area is varied automatically, as described.

Further improvement in liquid propellant rocket engines may be gained with the plug nozzle in combination with systems employing gas pressurization in place of turbo-pump fed systems. Such rocket engines, sometimes referred to as liquid boosters, sometimes use a small solid propellant charge as convenient means for pressurizing the liquid, the gaseous products of combustion generated by the solid propellant expelling the liquid from a tank into the thrust chamber.

The flow rate of the liquid propellant is dependent on the rate of gas generation of the solid propellant and, hence, the pressure, thrust and burning rate of the liquid booster experiences a variation as a result of the temperature sensitivity of the solid propellant charge. Therefore, the variable throat area of the plug nozzle will provide improvements, such as constant pressure and minimum thrust variation with a liquid booster similar to that already described for solid propellant rocket engines.

The plug nozzle will, as in the case of solid propellant booster rocket engines, also provide simplified thrust vector control, thereby eliminating large aerodynamic surfaces for stability which cause high aerodynamic drag and heavy structural loads requiring expensive attachment fittings. Also eliminated is the need for high precision nozzle thrust alignment; better performance is provided by reducing dispersion.

Figure 12:
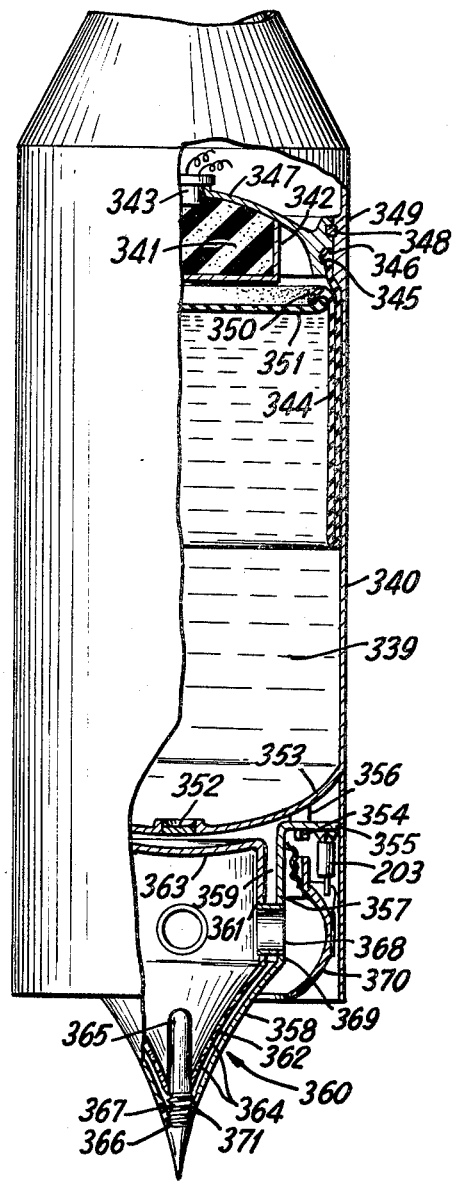
FIGURE 12 is an elevation view partly in section of a liquid propellant rocket and its control system embodying an expellant bag and nozzle control structure.

A typical liquid propellant gas pressurized liquid booster rocket utilizing the plug nozzle is illustrated in FIGURE 12. While the illustration is based on the use of the newer liquid monopropellants, its extension to a bi-propellant system is straightforward. In the design shown, the thrust chamber including the plug surface is regeneratively cooled. For simplicity, the cowl is made of uncooled high temperature resistant refractory material such as used frequently in uncooled nozzles for solid propellant rocket engines. The cowl may also be liquid cooled if desired by suitable means (not shown) such as regenerative cooling by injection of additional propellant into the annular chamber enclosed by the cowl, or by film-cooling.

In FIGURE 12, the monopropellant 339, stored within the pressure vessel or tank, 340, is pressurized by the solid propellant charge 341 within the container 342 when the ignitor 343 is energized. An expellant bag, 344, separates the gaseous products of combustion generated by the solid propellant from the liquid propellant preventing chemical interaction, aeration of the liquid, and heat transfer between the hot gases and cool liquid, which have the effect of producing erratic pressures as the gases are cooled. The expellent bag is in the form of a sleeve seal, one end of which has a bead, 345, which engages a groove, 346, in the head closure, 347. The latter is structurally attached by the key, 348, to the flange, 349, of the tank, 340. The bead 345 then forms a seal, similar to an O-ring seal, between the head closure and tank, and also retains the sleeve within the tank. The opposite end of the sleeve, which folds back on itself, is permanently bonded at 350 to the flexible diaphragm 351. A burst disc, 352, at the lowest portion of the aft head closure 353 of the tank 340 seals the liquid propellant within the tank 340.

The thrust chamber assembly, 360, is fabricated as a separate sub-assembly to facilitate production and attached to the aft head 353 of tank 340 by bolts, 354, through the flange, 355, mating with the boss, 356, on the head, 353, although a welded connection may be optional. The thrust chamber assembly comprises an outer cylinder 357 to which is attached a plug surface, 358, forming an annular gap, 359, with respect to an inner cylinder 361 and an attached inner plug surface 362, the gap thus formed providing a coolant passage for the regeneratively cooled thrust chamber. A thrust chamber head closure, 363, completes the coolant passage by providing a gap in relation to the tank aft closure 353.

The injector comprises simple orifices, 364, through the inner plug surface near the apex of the inner plug, the emerging jet impinging on the igniter rod, 365, which is inserted through the opening, 366, in the outer plug surface, 358, and retained therein such as by the thread, 367. Small bleed holes, 371, may be provided through the outer plug surface, 358, near the apex to provide local film cooling of the plug tip as required.

The igniter surface is coated with a catalytic material, such as lithium or its compounds, which reacts with the incoming monopropellant to cause hypergolic ignition.

Radial ports, 368, are provided through the inner and outer cylinder walls of the thrust chamber by the collar, 369, for passage of combustion products radially outward into the annular volume enclosed by the cowl, 370, in the manner previously described. The cowl, 370, is flexibly mounted to the cylinder, 357, such as by a bellows, or flexible seal, illustrated and described in greater detail hereinbefore. Means for positioning the cowl, such as mechanical or fluid springs, or actuators such as 203, including means for thrust vector control, may also be as previously described. The various controls for variable thrust may also be used, with the knowledge that there will be a greater time lag due to the large volume of stored gas as burning time progresses.

Means for thrust termination may be provided as part of the cowl assembly, as previously described, since burst discs provide no means for terminating propellant flow. A control valve may replace the burst disc when thrust termination is required, although burst discs may provide greater reliability and freedom from leakage during prolonged storage.

In operation, when the igniter, 343, is energized, the solid propellant charge generates gas pressure which acts on the diaphragm, 351, causing the expellent bag to extend downwardly toward the tank aft head, 353. Upon pressurization, the burst disc 352 fails, permitting propellant to enter the coolant passage 359 whence it is injected into the thrust chamber through orifices, 364, striking the igniter, 365, thereby producing positive ignition. After ignition is initiated, combustion may continue by the presence of hot gases within the chamber, with no further need for the igniter.

As the propellant level reduces near the end of burning, the flexible diaphragm 351 will deflect to conform to the shape of the aft head closure 353 thereby assuring maximum volumetric efficiency approaching 100% displacement of stored propellant. Since certain monopropellants have, in general, the properties of nitric acid, the sleeve and diaphragm of the expellent bag may preferably be made of acid resistant plastic materials, such as the newer fluorelastomers, which exhibit good chemical resistance, and good mechanical properties over a wide temperature range.

Figure 12A:
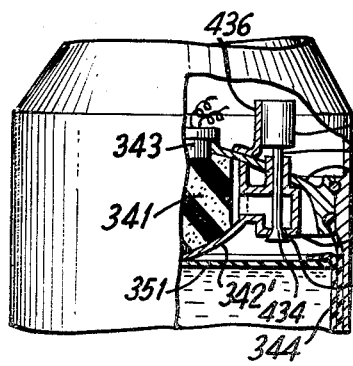
FIGURE 12A is a fragmentary elevational view, partly in cross-section, illustrating a modification to the system of FIGURE 12.

An alternate means for gas pressurization of liquid propellant rocket engines is shown in FIGURE 12A, in which the simple container 342 of FIGURE 12 is replaced by a pressure vessel, 342', having a controllable variable area discharge orifice at 431. The assembly including the pressure vessel 342', solid propellant charge 341, variable area orifice 431 becomes a gas generator capable of having a variable and controllable mass flow rate.

Following ignition of the solid propellant by energizing the igniter 343 electrically, the internal pressure within the pressure vessel 342' is controlled independently of the pressure which may exist at any time in the tank 340 by controlling the discharge orifice area, 431. The latter is controlled by the actuator 432, supported by bracket 436, by means of the rod, 433, which varies the position of the valve, 434, relative to the seat, 435. As the orifice area is varied, gas generator pressure varies, and through the dependence of propellant burning rate on pressure, the gas mass flow rate varies. This, in turn, varies the mass flow rate of the liquid propellant providing variable thrust. In this arrangement, simple mechanical or fluid springs may be used to position the cowl, 370, of the thrust chamber assembly, 360, of FIGURE 12, the variable thrust being controlled by the solid propellant gas generator with variable mass flow rate.

The actuator, 432, controlling the rate of gas generation, may also be driven by a timing device, similar to that described for the actuator, 330, in the turbo-pump fed system of FIGURE 11; the gas pressurized liquid booster rocket engine may then also have the regressive thrust-line characteristic similar to the turbo-pump system, and analogous to regressive burning solid propellant rocket engines described previously and in further detail hereinafter. Either of the three systems may then be used for various missile applications such as those hereinafter described.

The variable mass flow gas generator may also automatically compensate for variation in internal ballistics of the liquid propellant as function of ambient temperature and other variables as previously described for solid propellant rockets.

Thus, it may be seen that new concepts in thrust chamber design, variable mass flow gas generators, simplified injector, expellent bag, general assembly and manufacture, make possible improved performance for liquid propellant booster rocket engines.

(F) APPLICATIONS TO DUAL STAGE ROCKET ENGINES

Considerable development effort has been spent on solid propellant rocket engines having two stages which combine high initial thrust for boost or acceleration of the missile, followed by a lower thrust level for sustained high speed flight, overcoming drag. The dual thrust level may be obtained with conventional nozzles by use of multiple grains, one for boost having a large burning surface or high burning rate or both, while the sustainer grain has relatively low values. With a constant area throat, high chamber pressures are required during the boost stage, with low chamber pressures during sustainer stage. The thrust range is thus limited by maximum chamber pressure and structural weight on the one hand, while combustion stability as well as performance, due to lower specific impulse at low pressures, limit the minimum thrust level.

Improved performance of dual stage rockets is possible with the variable area nozzle. For nominal thrust ratios, reduced weight of inert parts is possible by operating at substantially constant pressure at both thrust levels, with the nozzle throat area reducing automatically after first stage burnout, such as by the use of mechanical or fluid springs as previously described. The thrust range may be further increased in this arrangement by use of springs having a high spring rate. This may be illustrated by reference to FIGURE 6 in which the curve B—B represents the combined propellant grains while the curve C—C represents the single longer duration sustainer grain for the second stage. If the spring rate, $k$, is high, the new characteristic line D'–D'' will have a greater slope. In this case, both chamber pressure and throat area reduce as operation shifts from curve B—B to C—C, along the line D'–D'', resulting in a greater thrust ratio.

Figure 13:
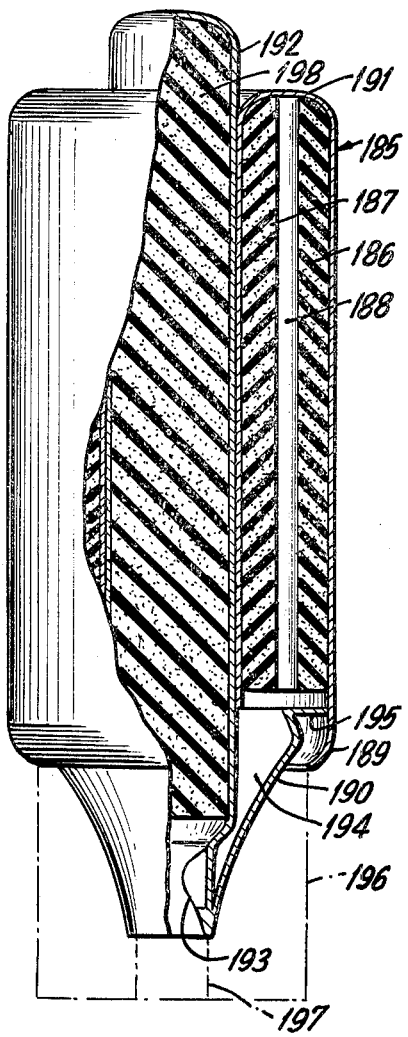
FIGURE 13 is an elevation view partly in cross-section of a dual stage solid propellant rocket and its control system.

For extremely high values of thrust ratio, say of the order of 50 or 100 to 1, new means may be provided, as illustrated in FIGURE 13, where the thrust ratio may have any magnitude. This combines the use of the plug nozzle for booster stage with a small conventional converging-diverging nozzle co-axially arranged within the plug nozzle for the sustainer stage, as shown and described below.

In FIGURE 13, the outer case 185 houses the booster propellant while the concentrically located inner case 192 contains the sustainer propellant. The booster propellant may consist of two cylindrical grains, 186 and 187 bonded to the outer and inner cases respectively and providing the internal burning surfaces enclosing the annular volume 188. The case 185 has a cowl 189 formed at its aft end, providing an annular throat area with the isentropic plug 190. An annular head closure 191 seals the booster case 185 to the sustainer case 192 to which is attached the conventional nozzle 193 at its aft end. Internal gas pressure acting on the plug 190 is carried by the internal case 192. The webs 194 and struts 195, maintain concentricity at the nozzles.

The plug nozzle 189, 190 may be designed to provide complete expansion between jet boundaries 196 and 197 while the conventional nozzle may have a contoured diverging section to provide axial discharge of gases within the jet boundary 197. In this manner, both stages may be fired either simultaneously or consecutively (by means of conventional igniters not shown) with minimum jet losses. When the shorter duration booster grains burn out, booster thrust ceases. The sustainer grain 198, which may be an end-burning or cigarette burning grain whose small burning surface and lower burning rate produce a low thrust for along duration, will continue to provide thrust. Since both chambers may operate at constant chamber pressure, minimum weight and maximum specific impulse or engine efficiency may be obtained for either stage.

The cowl 189 may, of course, be made a separate unit and sealed to case 185 so as to provide a variable throat area, vector control, and advantages of constant pressure operation, as previously described and illustrated.

It may be seen that the new techniques for rocket engine control hereinbefore described, make possible improved missile performance when the new rocket engine characteristics are integrated with the missile.

(G) APPLICATIONS TO LONG RANGE BALLISTIC MISSILES

Figure 14:
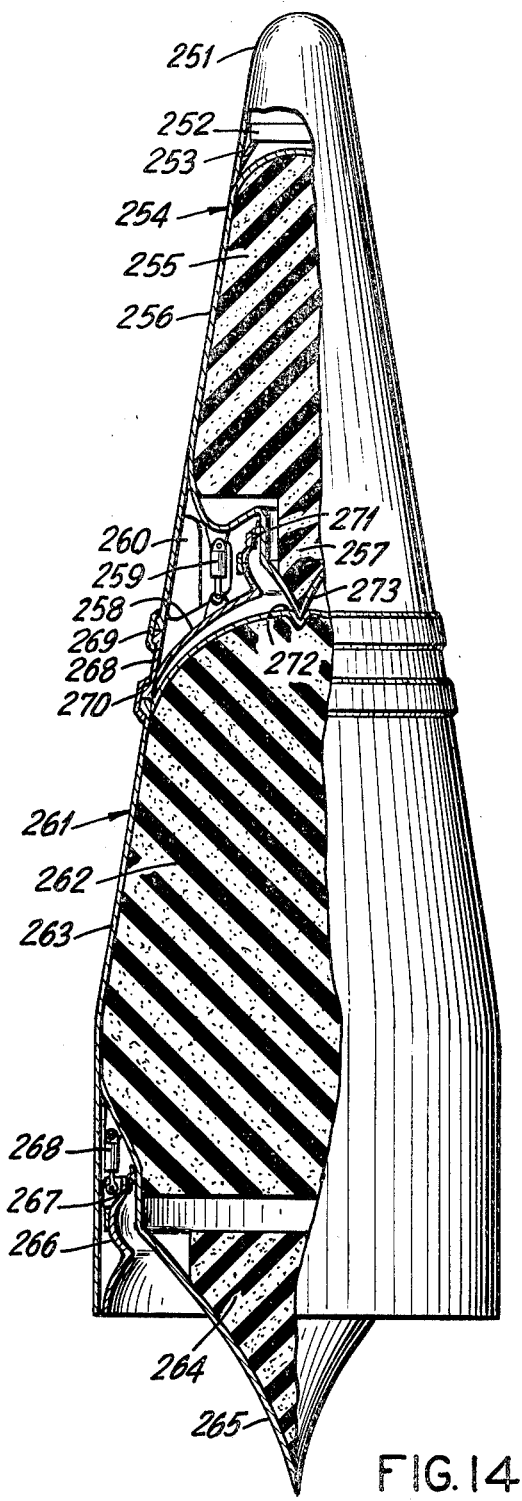
FIGURE 14 is an elevation view partly in section of a dual stage solid propellant missile system with thrust control and with the stages arranged in tandem.

A long range ballistic missile providing improved performance is illustrated in FIGURE 14, in which 251 is the warhead, and 252 is a guidance system supported by the airframe 253. The second stage rocket 254 contains a solid propellant, 255, within a rocket case, 256. Additional propellant 257 may provide higher loading density, filling the space within the nozzle plug, 273. The variable area cowl and expansion cone, 258, is attached by the bellows 271 and actuators 259 to the case 256. Control system 260 for the missile may be mounted in the second stage between the nozzle 258 and the case, 256.

The first stage 261 and the second stage 254 are joined by the split collar 268 and the upper and lower clamps 269 and 270.

The first stage rocket contains propellant 262 within the case 263, with additional propellant 264 filling the space within the nozzle plug 265, increasing loading density. The cowl and expansion cone 266 is attached to the case by the bellows 267 and actuators 268, the details being as previously described.

The propellant grains for both first and second stages are designed to provide the desired regressive characteristics. This, then, permits automatic reduction of thrust as a function of time, permitting higher acceleration at launch without exceeding maxmum acceleration near burnout. The grain regressivity is selected to permit automatic operation of the variable nozzle area expansion ratio and, hence, nozzle thrust coefficient as a function of altitude, using time as a common parameter. Both of these purposes may now be accomplished with no additional controls other than the means already described for positioning the nozzle cowl, such as the mechanical or fluid springs previously described (or the controllable solid propellant systems already described). Any of these methods, of course, will still provide minimum case weight by acting as constant pressure devices independent of ambient temperatures; they will also act to minimize thrust variation with ambient temperature changes, as described.

While the propellant grains may have any configuration so long as the desired regressivity is obtained, for the purpose of illustration, an end-burning grain is shown which has a tapered or conical cross-section which reduces in area as burning progresses. In the illustration shown in FIGURE 14, ignition may occur on both surfaces of the two grains 262 and 264 in Stage I rocket engine. The burning surface then remains substantially constant for the first portion of the burning time, the progressivity of grain 262 after ignition being reduced by the regressivity of grain 264. Small variation in grain geometry particularly increased burning area, will have little serious effect since the nozzle cowl will extend automatically, increasing throat area, eliminating pressure peaks. This permits greater freedom in attaining high loading densities.

When the first stage is ignited (by conventional means not shown) the nozzle cowl 266 assumes its normal design position, as by compression of the springs or actuators 268. In this position, the area expansion ratio may be approximately 5, corresponding to optimum thrust coefficient at sea-level with a chamber pressure of 500 p.s.i.a. As the missile gains altitude, the chamber pressure and mass flow rate remain constant during an initial period, as long as burning surface remains constant. After a time, $t_1$, the missile would be at an altitude at which the pressure ratio will have increased to a value causing the jet diameter to increase to the full nozzle diameter. The area ratio, with constant cowl position, may now be 10, corresponding to an optimum nozzle coefficient at an altitude of 25,000 feet. As the missile continues to climb, the grain becomes regressive. The reduced value of K as burning surface reduces would tend to reduce chamber pressure. The springs (or control system) 268 then cause the nozzle cowl 266 to retract, the reduced throat area reducing thrust as constant pressure is maintained, and increasing the expansion ratio. As an example, when burning has progressed to a section where the propellant burning surface was approximately one-half of its initial value, the mass flow rate is reduced to one-half its initial value; the throat area also reduces to one-half of its initial value thereby again doubling the nozzle expansion ratio approaching a value of 20. This would now correspond to an optimum ratio and optimum thrust coefficient at approximately 45,000 feet altitude with the constant chamber pressure of 500 p.s.i.a.

Referring to standard references showing the relationship of nozzle thrust coefficient as functions of pressure ratio and area ratio, it may be seen that the variable area expansion ratio increases the nozzle thrust coefficient and, hence, the propellant specific impulse by more than 10% at upper altitudes, while still maintaining optimum nozzle coefficient at sea-level. In view of the large propellant masses required for long range missiles, this permits substantial reduction in actual propellant weight, with corresponding reduction in missile size and case weight.

When this same feature is used in upper stages, together with maximum nozzle expansion ratios, the higher specific impulse makes possible reduced propellant weight of upper stages. This saving is magnified by reduced weight of lower stages, substantially reducing take-off weight, and size of the missile as a whole.

Thus, it may be seen that by the use of a regressive burning propellant, whose design is coordinated with the missile flight trajectory, simple control means may be provided whereby the rocket engine automatically increases the nozzle expansion ratio and thrust coefficient as a function of altitude. The resulting grain regressivity then also reduces thrust automatically as propellant is consumed, inherently providing throttling to restrict maximum acceleration as the mass of the missile reduces.

Upon first stage burnout, the clamps 269 and 270 are released. This may be accomplished by explosive bolts, or by a quick release mechanism responsive to loss of chamber pressure in the first stage. The ring 268, which is split circumferentially into two segments, falls away providing clearance for the large expansion cone of the second stage nozzle 258 to oscillate for vector control.

The second stage rocket engine is made regressive to accomplish the same variable expansion ratio and also to restrict maximum acceleration, as with the first stage. The expansion ratio may increase from, say, 40 after ignition, to twice that value as the missile continues to climb.

The second stage nozzle is designed to utilize the maximum cross-sectional area available within the missile envelope, thus providing maximum nozzle thrust coefficient at the extremely high pressure ratios in and beyond the upper atmosphere. It may be of the internal expansion type, described and illustrated in FIGURE 4. Since second stage ignition occurs only after high altitudes are reached, the high pressure ratios result in high Prandtl-Meyer angles. The nozzle may therefore have a large angle $\theta$ at the throat, followed by a contoured divergent section.

The flow undergoes expansion beyond the throat, followed by some recompression as it is directed aft in an axial direction. Thus, extremely large area expansion ratios may be obtained within relatively short nozzle lengths.

Overall missile length may be reduced by nesting the upper head closure of the first stage within the nozzle expansion cone of the second stage. Clearance for the plug tip of the second stage nozzle may be provided by a recess in the first stage head closure, if required, as at 272, and for alignment of successive stages.

The double release clamps 269 and 270 and split ring 268 may be replaced by a single clamp or equivalent fitting. This would reduce the nozzle expansion cone to insure sufficient clearance on separation. The higher nozzle thrust coefficient and higher specific impulse with the larger expansion cone would save propellant weight when the two clamps are used.

Thrust vector control, as well as thrust termination may, of course, be incorporated with the variable area nozzles as previously described.

Multiple stages exceeding two may, of course, be used. The conical grain is illustrative only of regressive burning grain. A cylindrical missile having cylindrical grains may, of course, be used, the desired regressivity being obtained by other grain geometries.

The propellant burning rate may be made regressive, rather than burning surface. This may be controlled by varying propellant composition, use of one or more grains; or by controlling or varying the length of wires sometimes embedded within the propellant grain to increase the burning rate; the number of wires per unit of cross-section being varied along the length of a cylindrical grain.

(H) AN ANTI-SPACE MISSILE WEAPONS SYSTEM

(1) General features

The novel missile capabilities herein described make possible a new and effective defense system for interception of attacking intercontinental ballistic missiles, artificial satellites, reconnaissance space vehicles, extra-terrestrial bodies, and other objects travelling through space.

A basic concept of the defense anti-space missile is to provide means whereby the final stage of a missile is capable of hovering flight at zero velocity at a great altitude in space for a finite time interval while the guidance system locks on the target. In such a configuration the missile may be regarded as a "space mine," a name coined to identify the concept. In this mode the guidance system computer calculates the length of time the "space mine" shall continue to hover, following which, it may maneuver in any direction in any of the three planes, i.e., climb or descend vertically; move left or right; or forward and aft. The computer system selects the optimum collision course, then increases rocket engine thrust from hovering flight to accelerated flight in any direction to intercept the missile. Preliminary analysis indicates that interception may be made anywhere within a sphere having a radius of approximately 200 miles (400 miles diameter).

The advantages of such a system are manifold:

(a) The space mine has maximum maneuverability in all three principal planes with minimum expenditure of energy since it starts from a position at rest. The thrust of the rocket engine may be increased to provide acceleration, with the vector control methods herein described employed for directional control of thrust to execute maneuvers as well as provide stability.

(b) The space mine defensive missile, including booster rockets capable of reaching altitudes of 1,000 miles, may be small enough to be air-launched from SAC bombers on air alert. It may, of course, also be ground launched, submarine launched, ship-board launched, or balloon launched.

(c) The small size is made possible because it requires less energy to reach a hovering altitude than is required to orbit at the same altitude; this relation being less than one-third for altitudes up to 1,000 miles above the earth's surface.

(d) The space mine missile is launched over friendly territory, and travels in a vertical trajectory; it never passes over enemy territory and is therefore less vulnerable to enemy counter-measures.

(e) Other missile systems for anti-satellite and anti-ICBM defense have been proposed in which the defensive weapon itself is placed into orbit. Since any orbiting defensive weapon must pass over enemy territory, it would itself be vulnerable to the space mine weapons systems described herein. The hovering "Space Mine" concept, therefore avoids the substantial short-comings of an "anti-satellite" satellite.

(f) The space mine may be launched at the earliest instant of early warning based upon only approximate trajectory information. Its hovering flight characteristics then permit a "holding period" in the general target area, awaiting more detailed information on the true trajectory of the enemy target.

(g) The hovering flight concept eliminates the split second accuracy required to intercept fast moving targets. It arrives early and waits.

(h) The vertical trajectory of the space mine requires no recall capability. Since means for re-entry are not required, friendly as well as enemy territory cannot be inadvertently damaged. It is only effective in space.

(i) The maneuverable space mine can intercept variable trajectory targets as well as correct for improved data on fixed trajectory targets.

(j) For use against ICBM's, mid-course interception is possible, providing advantages of area defense vs point defense.

(k) For space mines equipped with nuclear war-heads, mid-course interception above the atmosphere provides minimum hazard from fall-out.

(l) The range of each space mine may be sufficiently great to permit a Weapons System with wide spacing between adjacent launchers; yet the overlapping ranges of each space mine can provide multiple hits from adjacent launchers on any one trajectory. A large band in space hundreds of miles in height and extending in length for thousands of miles, can be defended with relatively few launchers.

(m) The hovering flight concept employed in the space mine may also be applied to decoy discrimination. Devices may replace the war-head on certain missiles (television, radar, infra-red, ion-beam, etc.) for "close-up" inspection above the atmosphere to relay information to ground stations or to other down-course space mines for target identification.

(n) The space mine concept insures the use of space for peaceful purposes. Any unidentified body travelling through space and not previously "cleared" (and perhaps inspected) may be destroyed.

(2) Trajectory of an ICBM target

While the defensive anti-space missile weapons system may be used against artificial satellites, reconnaissance space vehicles, and other objects travelling through space, the interception of enemy ICBM's offers a most difficult problem because of the short time periods involved. The anti-space missile weapons system may then be best described with respect to interception of an enemy ICBM by the following example, for which its use for interception of other space objects may be readily apparent.

Figure 15A:
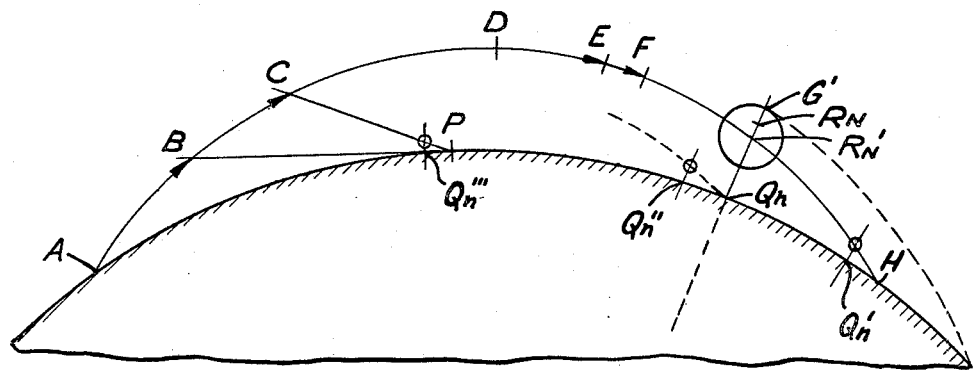
FIGURES 15A–15D, 16 and 17 are diagrams illustrating geometric aspects of missile defense techniques according to the invention.
Figure 15C:
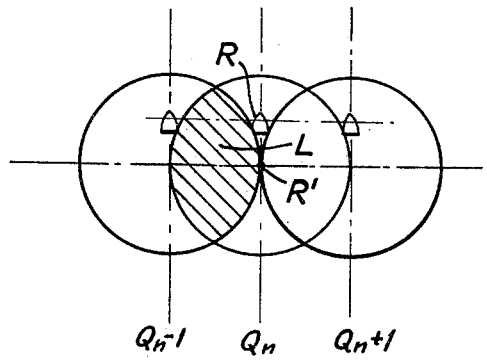
Figure 15B:
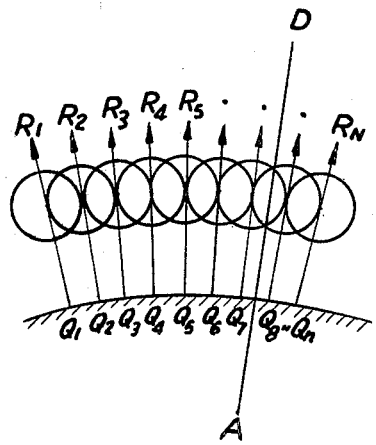

An area defense type anti-ICBM missile weapons system capable of intercepting invading missiles at great altitudes and over a wide area is illustrated in FIGURES 15A and 15B, in which FIGURE 15A shows a side elevation of the enemy ICBM trajectory at points ABCDEF relative to the earth's surface, $APQ_nH$. The enemy missile is launched at A and is intended to reach the target at H. The defensive missiles are launched at $Q_n$, having a vertical trajectory normal to the earth's surface, indicated by the line $Q_n$–$G'$, which, extended, passes through the earth's center.

FIGURE 15B shows the end elevation, the line A–D representing the plane of any one possible trajectory of the enemy ICBM, while $Q_1$–$R_1$, $Q_2$–$R_2$, $Q_n$–$R_n$ are defensive missile trajectories from ground launchers spaced laterally for interception over a broad area.

(3) Phases of the defensive missile's flight (a) *Launch and climb.*—The major improvement in the anti-ICBM missile is in the final stage. Any number of lower stages may be used, with any type rocket engine, although solid propellant rocket engines similar to that previously described in FIGURE 14 are preferred because their ready state storability and greater reliability permit launching on short notice and within the time limits for ICBM interception.

When a solid propellant is also used for the final stage, it may be generally similar to that illustrated for Stage II of FIGURE 14 with further improvement incorporated for this specific application, as will be described.

The lower stages are fired consecutively in a vertical trajectory, imparting a high velocity to the final stage of approximately 11,000–12,000 feet per second at an altitude of approximately 540,000 feet (100 miles). It then "coasts" to an altitude of 2.7 million feet (500 miles), as its kinetic energy is converted to potential energy. During this interval, vernier rockets may be employed for attitude control. For example, four small thrust chambers equally spaced about the missile centerline and normal to it could be selectively fired to produce a stabilizing force in the event small perturbations caused the missile to deviate from its desired attitude.

When the missile reaches its maximum altitude, its velocity reduces to zero, and the final stage rocket engine is ignited, initiating hovering flight. If the missile is allowed to coast to zero velocity under one-g, or gravitational acceleration alone, it reaches zero velocity relatively slowly and with a relatively extended coast period.

For example, at an assumed altitude of 600 miles above sea-level, the local gravitational constant is 24.35 ft./sec.$^2$. During the last ten seconds, the hover stage will have climbed 1218 feet (0.23 mile); and during the last sixty seconds, it will have climbed 43,800 feet (8.3 miles).

To reduce this time, a retro-rocket may be mounted at the upper end of the hover stage and activated near the end of the coast period so as to deliver thrust opposing the vehicle velocity. Vehicle deceleration could then be greater than the 1 g gravitational force acting on the vehicle. In this case, in order to reach the same altitude with the retro-rocket, the maximum velocity at the end of boost would have to be increased correspondingly. The need or desirability for use of the retro-rocket could readily be determined by the overall timing of events; it can permit delayed launching without loss of missile effectiveness at the desired altitude.

(b) *Hovering flight.*—The solid propellant rocket engine for the final stage missile has a regressive burning grain whose burning surface decreases in the ratio of the initial weight to its burnout weight. Its initial thrust is then just equal to its gross weight and, as propellant is consumed, the reduced burning surface also reduces thrust automatically by means of the variable throat area nozzle, as previously described. The reduced rocket thrust is continuously equal to the remaining mass instantaneously as a function of time, thus permitting hovering flight at zero velocity for maximum duration, or "action time," for any given total propellant weight. Final adjustment to insure thrust-weight equality may be obtained automatically by the use of the velocity regulating servo control systems described hereinbefore. In this case, the velocity is maintained constant with its magnitude equal to zero. Thrust vector directional control maintains stability of the missile in hovering flight at this altitude.

It can be shown that the duration of hover-time, during which the rocket engine will operate under the above conditions, is given by the following relation:

$$t_h = \frac{g_o}{g} I_s \operatorname{Ln}\left(\frac{M_o}{M_b}\right)$$

where:

$t_h$ = hover time, seconds
$g_o$ = acceleration due to earth's gravity at sea-level = 32.16 ft./sec.$^2$
$g$ = acceleration due to earth's gravity at altitude
$I_s$ = propellant specific impulse
$M_b$ = mass of missile at burnout
$M_o$ = initial mass of missile
Ln = natural log.

It may be noted that hover-time increases as "$g$" decreases at higher altitude. Using the inverse square relationship of gravity with altitude, the hover time at 1,000 miles above sea-level is more than 56% greater than at sea-level. The physical significance is obvious. Less thrust is required at altitude to support the same mass with a lower apparent weight due to lower "$g$," the reduced propellant flow rate permitting longer burning times for the same mass ratio.

Figure 15D:
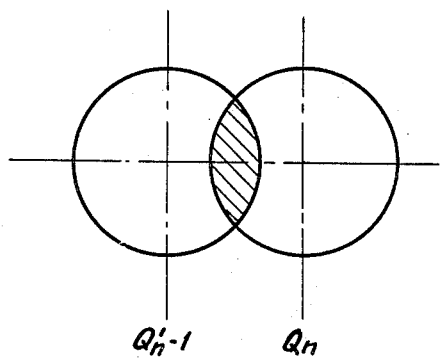
Figure 15E:
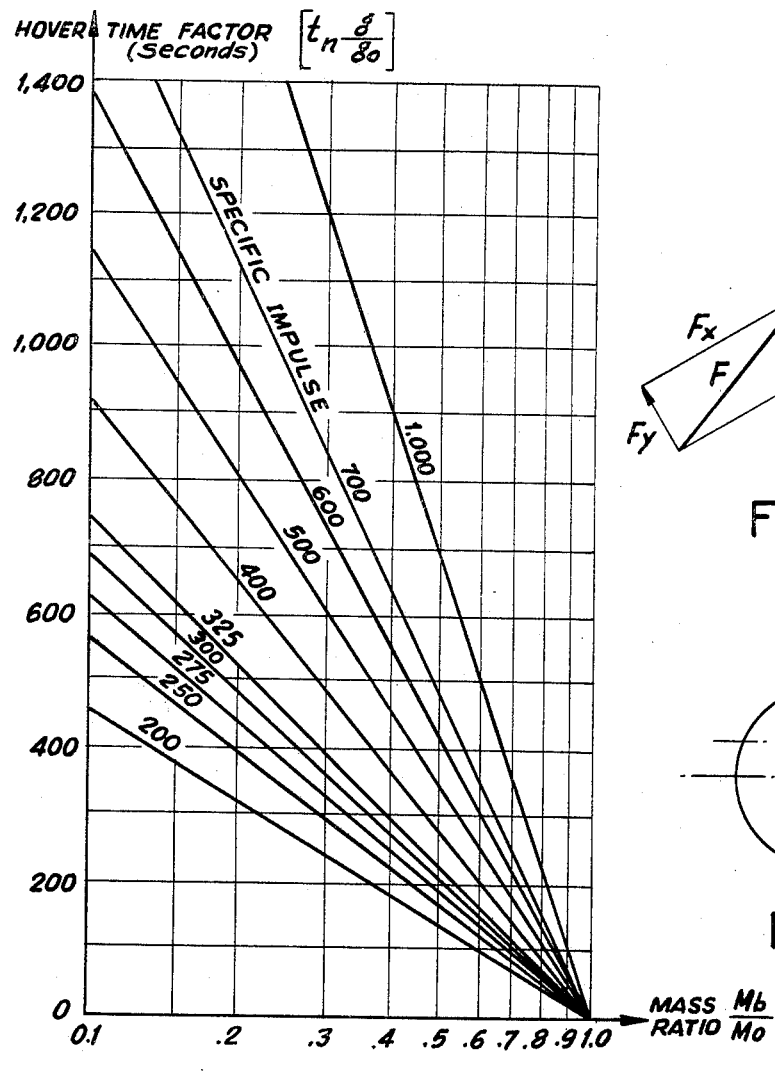
FIGURE 15E is a graph illustrating the relationship between hover time and various parameters.

FIGURE 15E shows hover time as a function of mass ratio and specific impulse. At sea-level, the ratio $g_o/g=1$, and the ordinates may be read directly. It is seen that substantial hover intervals are attainable.

It is estimated that assuming a propellant specific impulse of 300 pound-seconds per pound under space conditions, and representative values of mass ratios, the missile may hover for a number of minutes.

The guidance and control system in the missile includes an instrument, such as a vertical seeking gyroscope or equivalent means, which establishes a vertical reference line passing through the center of the earth. This instrument, operating on the control system including the nozzle vector control, maintains the vertical trajectory during boost and a vertical attitude of the missile during hovering flight; it also provides a vertical reference axis for directing the missile to the target in accelerated flight.

(c) *Intercept maneuvers.*—The missile guidance system may be either an active, semi-active or passive system, or combination, incorporating a homing device of any type, such as an active radar seeker, which locks on the target while the defensive missile is at rest in hovering flight. The guidance system computer makes final determination of the invading ICBM trajectory, distance and velocity, computes the optimum course for the defensive missile to insure interception and, from information on its own propulsion system, the time to point of impact and the length of time it shall continue to hover before initiating the chosen course. As an extreme case, if the defensive missile is already in the path of the invader's trajectory, it need only continue to hover to effect interception.

Figure 16:
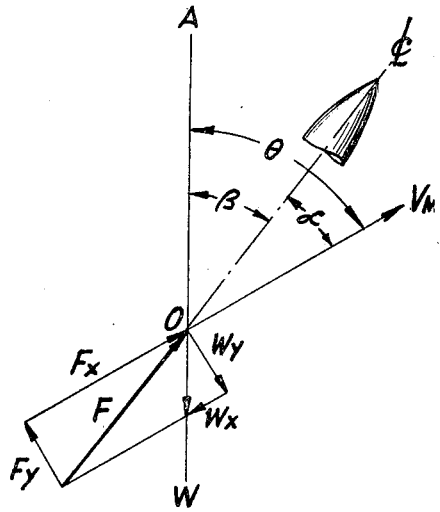

The maneuverability of the missile from its hovering position is illustrated with the aid of FIGURE 16. Due to zero drag in vacuum conditions in space, the missile is subject to forces due to thrust, gravity and inertia. The variable area nozzle provides the increased thrust for acceleration, while the nozzle vector control system rotates the missile to provide the desired heading to achieve the desired course. Maneuverability in any direction may be accomplished as follows:

In FIGURE 16, the line O–A represents the vertical reference axis and also the axis of the missile during hovering flight. The angle, $\theta$, which may have any value, represents the desired course for the missile to intercept the target. The missile is then rotated through the angle $\beta$ with respect to the vertical reference axis, and engine thrust increased for accelerated flight. The thrust continues to act along the missile centerline, with the nozzle vector control automatically maintaining this thrust alignment. In order to reduce the number of variables and increase reliability, it is preferred that the instantaneous engine thrust for acceleration be some constant multiple, $k$, of the insantaneous missile weight; i.e., the ratio of thrust to weight be a constant $k$.

Referring to FIGURE 16, the angle $\beta$ is selected so that the component of thrust, $F_y$, normal to the flight direction just equals the component of weight, $W_y$, normal to the flight direction. The total thrust and weight forces, F and W respectively, then produce a resultant force $(F_x - W_x)$ on the missile in the direction of the vector $V_m$ at the desired angle $\theta$ with the vertical reference axis. Since the ratio of the thrust and weight forces, $k$, is preferably maintained constant with time, the direction of the resultant remains constant, and for a given value of $k$, the flight direction $\theta$ is a function of the angle $\beta$ only.

The missile then side-slips, or "flies" at some "angle of attack," $\alpha$. The magnitude of missile acceleration in the direction $V_m$, is then a function of the resultant force in this direction, $(F_x - W_x)$ which, divided by the missile mass, produces the acceleration in the $V_m$ direction. The magnitude of that acceleration is a function of the angle $\theta$. This is illustrated in the polar diagram of FIGURE 17 where the point R represents the position of the missile during hovering flight while the radius vectors 0° through 180° represent the maximum range in the respective directions as a function of the variable acceleration. The diagram shown is for a thrust-weight ratio of 2.

Figure 17:
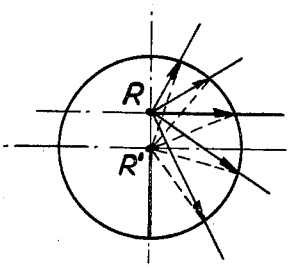

As shown in FIGURES 16 and 17 and by the above relations, when the missile climbs vertically, $(\theta = 0°)$, gravity opposes missile acceleration and equals $k-1$. In vertical descent under power, gravity aids missile acceleration which is then equal to $k+1$. While, of course, the missile will continue to descend after the end of powered flight, the loss of vector control after thrust exhaustion results in a loss of control over the missile, hence, the effective range is limited to the range of powered flight.

While the missile range thus actually varies as a function of the flight direction $\theta$, the maximum effective range is the same as a true circle whose center R′ is displaced from the actual hovering position R by the height of free fall under gravity only during the time of accelerated flight. Thus, for purposes of range, the missile may be considered at R′, and subject to gravity free acceleration equal to $k$.

Similarly, for any course angle $\theta$ with respect to the actual missile position R, the corresponding missile heading, may be easily determined, since the difference, or angle of attack ($\alpha$) will be equal to the difference in the slope of the radii drawn from R and R′ respectively, to any point on the circle. A vector control system such as the one illustrated in FIGURES 10C and 10D may be employed to implement this technique.

The ability of the missile to maintain the desired flight path, $\theta$, then depends on the accuracy of the heading angle, $\beta$, and maintenance of a constant thrust-weight relationship $k$. If the thrust-weight ratio varies from its design value, or increases or decreases with time, the course angle $\theta$, will vary for a given heading, $\beta$ rising above or below the target. Even in the event the guidance system corrects for this deviation by supplying a new direction $\theta'$ to the mechanical computer and control system, in the case of increased thrust-weight ratio the range will be reduced because of higher propellant consumption, again risking failure to reach the target. The reliability is considerably enhanced by positive means to control the thrust-weight ratio $k$.

The accelerometer servo of FIGURES 10A, 10B and 10E becomes ideally suited for this application, providing a closed loop servo-mechanism which maintains the thrust-weight ratio at its desired value. This is true regardless of the fact that the resultant missile acceleration is not co-linear with the missile axis, or axis of the accelerometer; it is also true regardless of the fact that the actual magnitude of the resultant missile acceleration varies with the desired flight path angle $\theta$.

Thus, the control system for providing constant velocity followed by the constant acceleration may be effectively applied to the final stage of an anti-ICBM missile. The missile flight direction may conveniently be varied at any time during flight simply by a single instruction from the guidance system, viz, the input signal $\theta$ to the analog computer which then changes the missile attitude, $\beta$, to accomplish a new flight direction. Meanwhile, the rocket engine continues to function automatically as it maintains a constant instantaneous thrust-weight ratio as propellant is consumed.

The above system offers minimum complexity for missile operation and, hence, maximum reliability.

It may be noted that the typical polar diagram of FIGURE 17 is true for any value of $k$. As $k$ increases, R approaches closer to R', the true center of the circle, while as $k$ decreases, this distance separates until, at $k=1$, R is at a point on the circumference corresponding to $\theta=0°$. This is obvious since, of course, with thrust equal to mass, the missile is unable to climb above its hovering position, or move directly laterally. It can only move downwardly within the area of the circle. In this system, the engine would continue to operate at constant thrust-weight ratio, with only missile attitude angle $\beta$ varied to execute maneuvers. As inspection of FIGURE 16 shows, varying $\beta$ will provide varying components of vertically downward and lateral accelerations.

Lower values of $k$ increase range by more economical use of available propellant. (Range is doubled as $k$ reduces from 2 to 1.) For example, the radius becomes 200 miles instead of 100 miles. This has the disadvantage that the missile travels too slowly, and sufficient time may not be available to utilize the full range successfully. The missile requirements will then be determined by the time cycle for the complete weapons system.

A third type of space mine maneuver may be practiced wherein the space mine is shifted laterally at constant altitude and brought to rest again in a new hovering position.

Starting with the missile initially at rest, it may be rotated clockwise through some angle $\beta_1$, the thrust being simultaneously increased to some value of $k > $ e.g., $<1$, so that the vertical component of the new thrust direction still balances the missile weight. The horizontal component of thrust then produces a lateral acceleration of the space mine which may continue for a time with the space mine then reaching some final velocity. At this point the missile may be returned to a vertical position, $\beta=0$, and continue to coast laterally at constant velocity in drag-free space for some required distance. Then, it is rotated counter-clockwise through an angle, $-\beta_1$, with simultaneous increase in thrust to decelerate from constant velocity until zero velocity is again achieved.

While the above maneuver is described as taking place at constant altitude, obviously, the same type of maneuver may be executed in a vertical plane by control of thrust-mass ratio, $k$, to be alternately less than, and/or greater than unity, as desired; or it may be combined with contolled vertical descent, by proper control over both thrust/mass ratio and the angle $\beta$.

One other method for maneuvering the final stage may be provided. After the hovering period, the engine thrust may be reduced below a value equal to the missile weight. The missile will then descend backwardly or tail first. By controlling the missile attitude angle $\beta$, the missile will then have an effective range lying within a cone whose apex is the hover position, extending downwardly. The cone half-angle is then a function of the reduced thrust. For example, if the thrust-weight ratio is reduced to one-half, the cone half-angle is 30°, with an angle of 45° becoming the limit as the thrust-weight ratio approaches unity.

Figure 18:
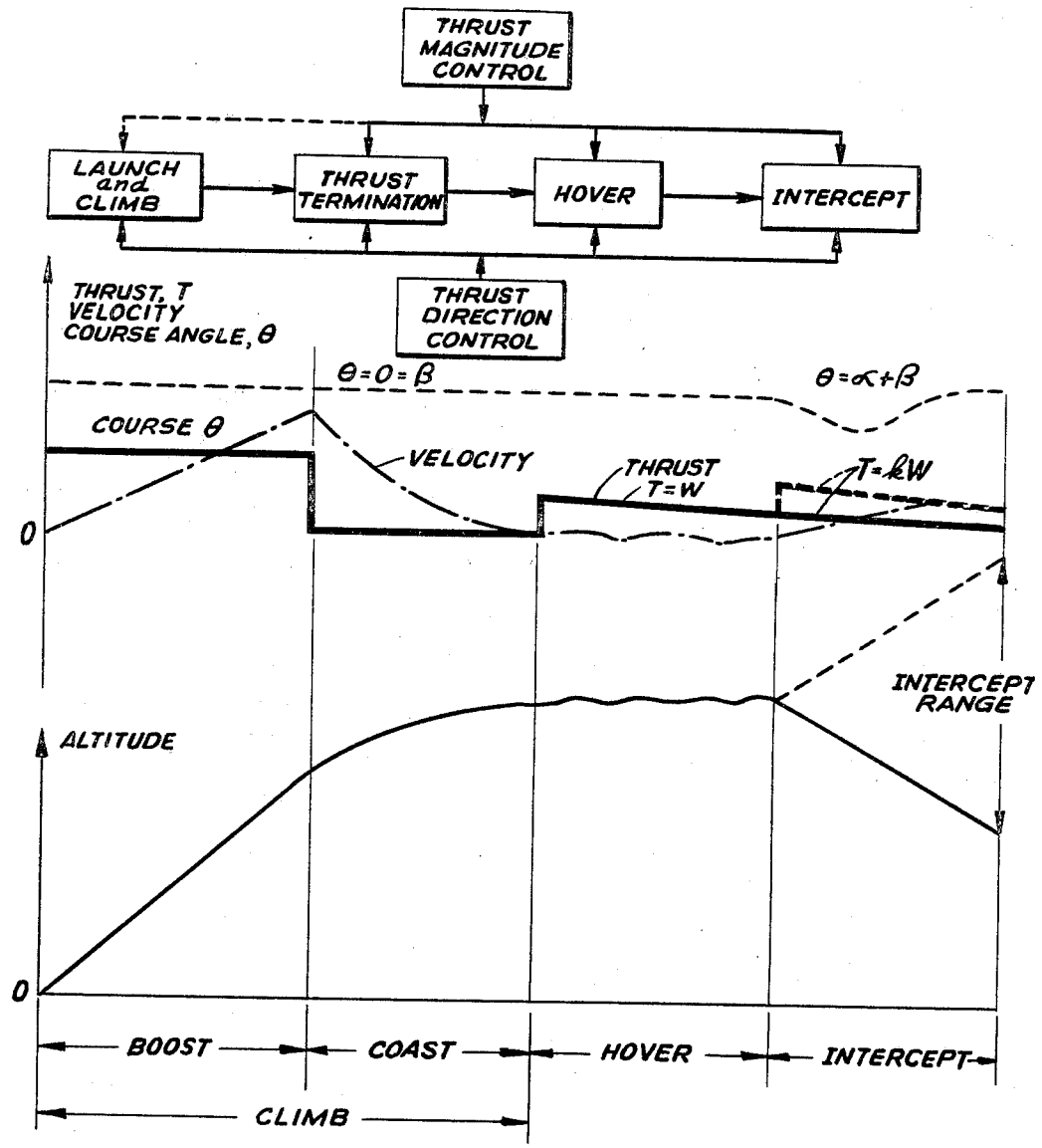
FIGURE 18 is a combined block diagram and family of curves illustrating the performance of various variables in the weapons systems according to the invention.

Graphically indicating the general characteristics of the foregoing system is the drawing of FIGURE 18 which depicts the "launch-climb," "thrust-termination," "hover" and "intercept" phases together with the corresponding behavior (schematically indicated) of selected parameters.

As symbolically indicated in FIGURE 18, thrust direction control is imparted during all four phases. Magnitude control through the last three phases and optionally during the launch-climb period, is also provided. In the illustrated example, vector control maintains the missile course in a vertical trajectory during the "launch-climb" phase and serves to maintain the proper missile attitude during the hover condition.

Starting with launch, thrust is increased from zero to establish the launch-climb phase and is then reduced or terminated to provide missile deceleration to the point where missile velocity reaches zero. Hovering then occurs and is maintained during the hovering period by adjusting thrust to equal the instantaneous weight of the rocket.

When the intercept maneuver is initiated, the thrust vector control system directs the missile on its required course by establishing the required heading angle $\beta$. During this intercept period, the thrust magnitude control system is appropriately controlled, preferably to maintain thrust proportional to weight. The constant of proportionality $k$, as noted hereinbefore, may be selected in dependence upon a number of factors, such as the overall timing established by the geometry of the intercept problem, including the intercept and target characteristics.

Various maneuvering techniques are available during the intercept period. As noted above, thrust may be maintained proportional to weight and the missile heading varied to control the missile course. Alternatively, thrust can be varied in conjunction with adjustment of missile heading to provide lateral missile motion. Certain descent maneuvers may also be executed by reducing the thrust to weight ratio to be less than 1.

The final stage need not be limited to a constant velocity-constant acceleration control system such as described above. The engine thrust may be varied to execute maneuvers in any desired manner; the engine control systems hereinbefore described may provide flexibility of engine operation to meet other design requirements as to thrust programming.

The complete weapons system may now be described.

(4) Exemplary intercept mission

Referring to the trajectory ABCDEFH of FIGURE 15A, the enemy ICBM is launched at A, passes through the maximum altitude, e.g. approximately 600 miles at D, and is intended to reach the target H, illustratively 5000 miles from A.

The defensive weapons system comprises an advance radar station, such as at P, which may be either airborne, land-based, or water-based, and located as close as possible to probable enemy launching sites for early detection. A number of parallel launching sites for defensive anti-ICBM missiles are located at $Q_n$, spaced laterally as shown in FIGURE 15B in a direction normal to the expected trajectories of enemy missiles. Each launching site maintains one or more launchers with antimissile missiles stored in ready position and may be based on land or sea.

In the illustration in FIGURES 15A and 15B, the antimissile final stage maneuverability is assumed to be equivalent to that exemplified by the polar diagram shown in FIGURE 17. This is illustratively accomplished with the aid of a constant velocity-constant acceleration control system, the latter provides a constant thrust-weight ratio of 2. It is estimated that a maximum range of 200 miles may be achieved after a one-minute hovering flight period at altitude.

The lateral spacing between launching sites may be varied considerably, but for purposes of illustration in FIGURE 15B, the spacing between adjacent stations is equal to the range at altitude (corrected for earth's curvature). The range of the final stages at altitude from adjacent launching stations then overlap, as shown to a larger scale in FIGURE 15C, where $Q_n$ represents any one of the stations, while $Q_{(n-1)}$ and $Q_{(n+1)}$ represents adjacent stations to the left and right respectively. The final position of the final stage during hovering flight is indicated at R, with its effective range being the same as a circle about the center R′.

In the illustrated example, and neglecting the segments of circles above and below the chord lines parallel to the centerlines, the weapons system will provide 100% defense over an area having a height of 340 miles and length equal to 200 miles times the number of launching sites. For a system of 10 launching sites, an area 340 miles high by 2000 miles long would have 100% coverage provided by the anti-ICBM missiles. The range overlap from adjacent launching stations then provides dual coverage over 70% of the total area between stations (shown shaded). Then, if the trajectory of an enemy ICBM passes through a point, such as L in FIGURE 15C, it may be intercepted by a missile launched from either $Q_{(n-1)}$ or $Q_n$. In the event of a massive attack at any one target, both bases may be used for defence against a number of ICBM's over 70% of the area.

In the event the height of the defense zone may be reduced, the launching sites may be separated by a greater distance, as shown in FIGURE 15D, requiring fewer installations to protect the same length of border but also reducing the area having dual coverage. It must be noted, however, that the maximum height of the defense zone directly over the launching site remains the full diameter of the final stage range.

A vertical trajectory is preferred for the defensive missiles, since this provides the shortest time to reach the required altitude; it also eliminates horizontal components of velocity which would be difficult to cancel in drag-free space, since only the normal component is decelerated by gravity. Also, it simplifies the control system since the same controls required for maintaining a vertical attitude during hovering flight may be used to maintain the vertical trajectory during boost. The vertical trajectory also offers minimum drag through the atmosphere during boost.

Interception at a high altitude is desired since the invading ICBM will have its minimum velocity near its apogee, gaining speed as it descends therefrom; it also minimizes the danger of radioactive fallout when nuclear warheads can be destroyed at great altitude; time factors, as well as size of the anti-ICBM missile booster present limitations in this respect.

A typical operation of the anti-ICBM missile weapons system may be described by referring to FIGURE 15A. The advance radar at P first sights the enemy ICBM at B, and immediately alerts all launching stations at $Q_n$. The radar P continues to track the ICBM for several minutes until, at point C the plane of the trajectory is determined with sufficient accuracy, such as plane A–D of FIGURE 15B, so that instructions to "FIRE" may be issued to either stations $Q_7$ or $Q_8$, FIGURE 15B, or both. Defensive missiles are then launched vertically, the final stage reaching its maximum altitude, such as $R_N$, FIGURE 15A, at which time the invading ICBM will have arrived at E.

The defensive missile may now hover at zero velocity, waiting for a period of, say, one minute while the guidance system locks on the target as it moves from E to F. This hovering period allows for variation in time to launch, climb to altitude, and variations in target trajectory. The relative velocity between target and defensive missile is nearly minimum if the latter is at rest and "waiting." The hovering period enables the guidance system computer to determine the enemy trajectory with final accuracy as previously described.

Since the defensive missile is hovering at zero velocity, it may maneuver in any direction with minimum acceleration as it executes the proper heading.

The guidance system may continue to correct the flight path as the missile approaches the target. The use of a proximity fuse, together with a nuclear warhead in the defensive missile will compensate for final inaccuracies, thereby insuring a "kill" at high altitudes.

It may be noted from FIGURE 15A that the actual defensive missile position at $R_n$ is above the theoretical memory ICBM trajectory, while its equivalent position $R_n'$, previously pointed out, is on the theoretical trajectory. This, then, equalizes the defensive missile's range about the theoretical or average ICBM trajectory.

Booster rockets of several sizes, and used in various combinations, may be stored on launchers at the launching sites $Q_n$. By means of thrust termination, the burnout velocity and, hence, the hovering altitude, $R_n$, can be varied over broad limits; lower altitudes provide defense for cities, air bases, factories and other target areas nearer the base $Q_n$, while higher altitudes will provide defense for similar enemy land targets considerably aft of H, relative to $Q_n$. The higher altitudes may serve for interception of artificial satellites and other space objects. A relatively few launching sites, such as $Q_n$, may then defend vast areas comprising many millions of square miles of the earth's surface.

In addition to those advantages and characteristics already described, the anti-ICBM missile weapons system described herein offers the following features:

(1) The defensive missile may be launched early with respect to the flight time of the invading ICBM on only approximate data for the enemy trajectory indicating only approximate zone where defensive missiles are required. Final corrections for interception are made at high altitude and at closer range to the target.

(2) The defensive missile at altitude then "waits" for the ICBM during a period of hovering flight while the guidance system locks on the target, makes final corrections to close in for the "kill."

(3) The defensive missile is capable of maneuvering in any direction in any of the three principal planes; it may execute turns in any direction at low accelerations.

(4) The relative velocity between target and defensive missile is minimum, without requiring excessive speeds for the defensive missile such as in a "chase" course.

(5) The vertical trajectory for the defense missile places it in or near the enemy trajectory in minimum time and with maximum reliability of its position, eliminating drift at high altitudes.

(6) An "electronic curtain" may be erected extending beyond 600 miles altitude over a width of, say, 2000 miles, by ten launching sites spaced approximately 200 miles apart. A relatively few launching sites may defend cities as well as military bases within an area of the earth's surface of approximately 4 million square miles.

(7) In the event of mass attack concentrated at a localized area, two or more adjacent launching sites can be used.

(8) Interception of enemy ICBM's may be executed at great altitudes beyond danger of radioactive fallout on the human race.

(9) The same launching sites are equally effective in intercepting artificial satellites, reconnaissance vehicles and other space objects, as well as enemy ICBM's. The task of reaching any satellite orbital altitude on a vertical trajectory for interception will always be less formidable than that of establishing the satellite in its orbit.

While the above techniques have been explained in relation to defensive weapon systems, they are also applicable for other more general purposes such as space maneuvering, rendezvous, navigation, etc. Effective use for these purposes may also be made of the nozzle configurations and control techniques described in my patent, No. 3,151,446.

(5) Exemplary point defense mission

The above weapons system principles, particularly the defensive missile performance characteristics, may be applied to a point defense Anti-Ballistic Missile Weapons System.

The size of the defensive missile booster rockets may be considerably reduced when launching to lower altitudes for interception nearer the defensive target, H, such as at $Q_n$, in FIGURE 15A. The defensive missile may still retain the reliability of hovering flight and high maneuverability to insure probability of a "kill," while more time is available for tracking the target. Disadvantages are the greater velocity of the target as it descends to lower altitudes, and the greater number of launching sites, such as $Q_n'$, to defend each target area. Such point defense weapons systems would, of course, be ineffective against artificial satellites or other space vehicles travelling at high altitudes above the earth.

Since the weapons system bases, $Q_n$, may be the first target for enemy ICBM's, smaller point defense weapons systems, similar to $Q_n'$ and located, for example, at $Q_n''$, FIGURE 15A, may be used to defend immobile land-based launching sites, $Q_n$. Similar defenses may be used near P also for defense against anti-radar missiles.

What is claimed is:

1. A method of controlling a missile propelled by rocket engine means comprising controlling said engine means for imparting thrust to accelerate said missile toward a desired altitude, reducing thrust for a period until said missile reaches zero velocity at said altitude, and establishing and regulating thrust level thereafter to equal the instantaneous weight of said missile for maintaining said missile in a hovering condition.

2. A method as defined in claim 1 including the steps of controlling said engine means for varying thrust following said hovering condition to move said missile from its hovering position.

3. A method as defined in claim 2 in which said thrust variation is effected by controlling said engine means for changing the direction of said thrust vector.

4. A method as defined in claim 2 including the step of controlling said engine means for maintaining a constant thrust magnitude to weight ratio during said missile movement.

5. A method as defined in claim 2 in which said movement is accomplished by controlling said engine means for changing said missiles' heading while maintaining a constant thrust magnitude-weight ratio.

6. A method as defined in claim 1 including the step of controlling said engine means for controlling thrust directing during said periods of acceleration, reduced thrust and hovering configuration, to achieve the required missile attitude and trajectory.

7. A method as defined in claim 1 wherein said missile includes at least one booster stage and a final stage and including the step of accelerating said missile with at least one booster stage and maintaining said hovering condition with a final stage.

8. A method as defined in claim 7 in which said final stage is ignited when said zero velocity condition is achieved.

9. A method as defined in claim 8 wherein said final stage includes a regressive grain and including the step of burning said regressive grain in said final stage whose burning surface decreases in the ratio of initial weight to burnout weight.

10. A method as defined in claim 1 in which said missile is maintained in a substantially vertical trajectory during said acceleration period.

11. A method of intercepting long range targets including intercontinental ballistic missiles comprising the steps of placing a thrust producing missile in sustained hovering flight substantially above the atmosphere and thereafter controlling said thrust production to maneuver said missile to intercept said long range space target.

12. A method as defined in claim 11 including the step of regulating the thrust of said missile during said hovering flight to compensate for changes in weight thereof.

13. A method as defined in claim 11 including the step of detecting target data during said hovering flight.

14. A method as defined in claim 13 including the step of maneuvering said missile in accordance with said detected target data.

15. A method as defined in claim 11 in which said missile is controlled to hover at an altitude in excess of 100 miles.

16. A method as defined in claim 11 in which said missile is regulated during said maneuver to maintain a substantially constant ratio between its thrust and weight.

17. A method as defined in claim 11 for use with a plurality of rockets and including the preliminary steps of detecting preliminary target data and selecting at least one of said rockets out of a plurality thereof in dependence on said preliminary data.

References Cited

UNITED STATES PATENTS 3,094,072   6/1963   Darilla _____ 102—50

VERLIN R. PENDEGRASS, Primary Examiner

U.S. Cl. X.R.

60—225, 253, 259; 102—49.4; 244—3.22